US005612890A

United States Patent [19]

Strasser et al.

[11] Patent Number: 5,612,890

[45] Date of Patent: Mar. 18, 1997

[54] SYSTEM AND METHOD FOR CONTROLLING PRODUCT DISPENSATION UTILIZING METERED VALVE APPARATUS AND ELECTRONIC INTERCONNECTION MAP CORRESPONDING TO PLUMBING INTERCONNECTIONS

[75] Inventors: John G. Strasser; Joseph Reymann; John E. Fail, all of San Dimas, Calif.

[73] Assignee: F C Systems, Inc., Pomona, Calif.

[21] Appl. No.: 445,053

[22] Filed: May 19, 1995

[51] Int. Cl.$^{6}$ .................................................... G06F 17/00

[52] U.S. Cl. ................................ 364/479.11; 364/479.1; 364/479.07; 364/479.06; 364/479.02; 364/479.01

[58] Field of Search .................................... 364/479, 478

[56] References Cited

U.S. PATENT DOCUMENTS

| | | | |
|---|---|---|---|
| 3,541,513 | 11/1970 | Paterson | 340/151 |
| 3,927,800 | 12/1975 | Zinsmeyer et al. | 222/26 |
| 4,127,845 | 11/1978 | Dansbach et al. | 340/151 |
| 4,135,181 | 1/1979 | Bogacki et al. | 340/310 |
| 4,161,720 | 7/1979 | Bogacki | 340/150 |
| 4,204,195 | 5/1980 | Bogacki | 340/151 |
| 4,608,560 | 8/1986 | Allgood | 340/825.52 |
| 4,636,950 | 1/1987 | Caswell et al. | 364/403 |
| 4,644,547 | 2/1987 | Vercellotti et al. | 371/69 |
| 4,855,729 | 8/1989 | Takeuchi et al. | 340/825.05 |
| 4,879,756 | 11/1989 | Stevens et al. | 455/39 |
| 4,910,658 | 3/1990 | Dudash et al. | 364/138 |
| 4,930,665 | 6/1990 | Devine | 222/28 |
| 4,934,565 | 6/1990 | Heisey et al. | 222/22 |
| 5,054,995 | 10/1991 | Haseley et al. | 415/17 |
| 5,056,017 | 10/1991 | McGarvey | 364/403 |
| 5,058,044 | 10/1991 | Stewart et al. | 364/551.01 |
| 5,077,671 | 12/1991 | Leslie et al. | 364/424.03 |
| 5,122,948 | 6/1992 | Zapolin | 364/131 |
| 5,249,129 | 9/1993 | Lamoureux et al. | 364/479 |
| 5,252,967 | 10/1993 | Brennan et al. | 340/870.02 |
| 5,270,701 | 12/1993 | Ito et al. | 340/825.03 |
| 5,270,943 | 12/1993 | Warn | 364/479 |
| 5,361,216 | 11/1994 | Warn et al. | 364/510 |
| 5,394,336 | 2/1995 | Warn et al. | 364/479 |
| 5,400,253 | 3/1995 | O'Connor | 364/442 |

OTHER PUBLICATIONS

Vehicle Lubrication Systems – 114 Catalog, Graco Inc. Form No. 303-040, Rev. Feb. 1992, pp. 8–9, 48–50.

*Primary Examiner*—Roy N. Envall, Jr.
*Assistant Examiner*—Y. Kundupoglu
*Attorney, Agent, or Firm*—Poms, Smith, Lande & Rose, P.C.

[57] ABSTRACT

A method and system for controlling dispensation of fluids utilizing at least one metered valve apparatus controlling a movement of fluid from at least one bulk fluid reservoir through at least one conduit in response to an authorization signal. A central controller establishes an electronic interconnection map corresponding to plumbing interconnections between at least one bulk fluid reservoir and at least one fluid conduit and employs the electronic interconnection map to generate the authorization signal. A remote communication link from the central processor to at least one metered valve apparatus facilitates transmission of the authorization signal.

23 Claims, 34 Drawing Sheets

50
52
PC1
PC2 (OPTIONAL)
PC3 (OPTIONAL)
PC4 (OPTIONAL)
PCn (OPTIONAL)
54
MODEM WMp1
MODEM WHp2
TELEPHONE MODEM
TELEPHONE MODEM
MODEM WMpn
58
BUILDING #1
MODEM WMc1
BUILDING #2
MODEM WMc2
BUILDING #3
TELEPHONE MODEM
REMOTE BUILDING
TELEPHONE MODEM
BUILDING #N
WMcn
56
RC1
VALVE
PUMPS
FLOWMETERS
RC2
'CHAINED' CONTROLLERS
RC21
RC3
MODEM WMp4
SEVERAL BUILDINGS/CHAINS
RCn

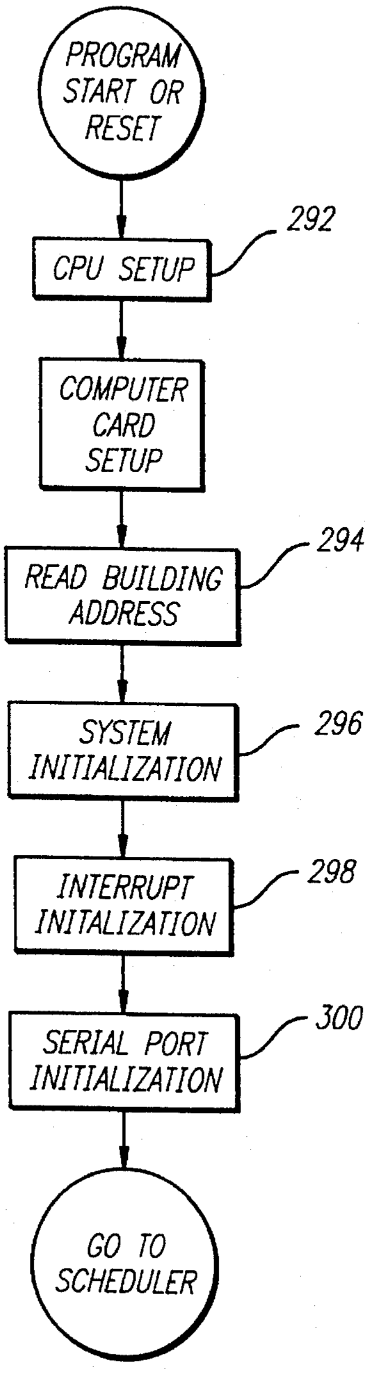
FIG. 22
FIG. 23
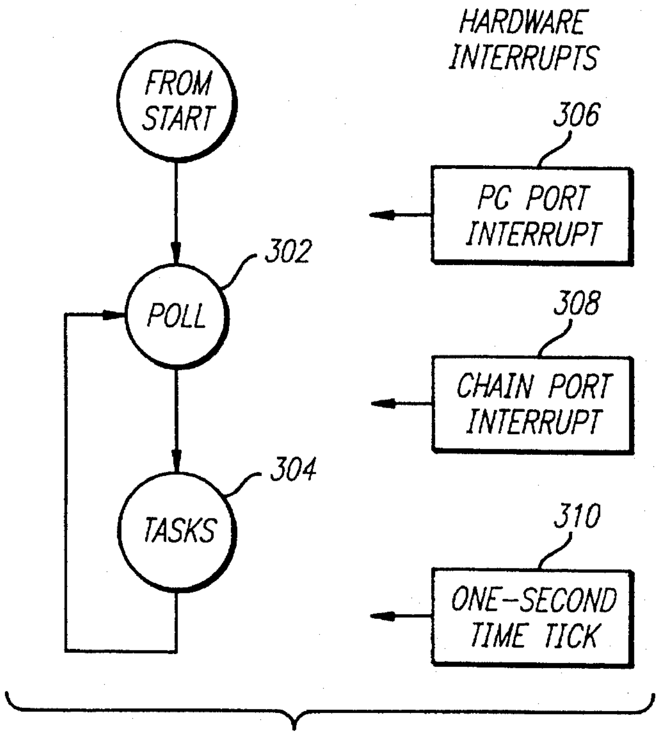

SYSTEM AND METHOD FOR CONTROLLING PRODUCT DISPENSATION UTILIZING METERED VALVE APPARATUS AND ELECTRONIC INTERCONNECTION MAP CORRESPONDING TO PLUMBING INTERCONNECTIONS

BACKGROUND OF THE INVENTION

1. Field of the Invention

The invention relates to a controlled, remote dispensation of fluids and other materials and, more particularly, to a method and system for controlling a dispensation of fluids including a remote communication link between a central controller and at least one metered valve apparatus.

2. Description of the Related Art

In large automotive repair and servicing facilities, such as car dealerships, fluids such as motor oil and transmission fluid are stored in bulk and are dispensed for use in individual vehicles.

In accordance with one prior art system, each of the bulk fluid tanks are coupled to individual work stations or bays by flow lines including a metering device. In addition, associated with each work station or bay is an electrically operated valve and a manual valve. At the Parts Department of the facility, a thumb wheel electromechanical device is set to the number of quarts of fluid (such as oil) to be dispensed, and the electromagnetic valve associated with one bay is opened. Wires extend from the Parts Department to the electrical valve at each work station or bay, to provide actuation of the electrical valve, thus enabling fluid flow to the selected work station or bay. Then, when the manual valve at the work station is opened to dispense oil, the metering device sends signals back to the thumb wheel device, successively stepping it toward zero as the oil is dispensed. When the device is reset to zero, the electrical valve is closed and oil flow is stopped.

The foregoing relatively primitive system involves the need for telephone calls from the work station to the Parts Shop or vice versa when the dispense operation is completed, and delays when the mechanics at several bays are requesting the dispensing, of fluids, or do not promptly dispense fluid following energization of the electromagnetic valves. Further, because no automatic record is made of the fluid dispensing, many facilities have encountered very substantial losses of valuable fluids, both during and after office hours.

Prior art uses a manually-operated controller. The operator uses a switch to select which station to pump to. This selects both the service bay and the fluid dispensed. The controller then counts clicks from a flow meter in that line.

Prior art systems are further characterized by the following disadvantages:

a. Only one dispense at a time.

b. Small number of fluids/stations per controller.

c. No queuing possibility: constant attention to operator required if jobs area to be sequenced.

d. Adding fluids/stations usually requires adding separate controllers at the control point since each controller only accommodates 8 fluid-stations.

e. A maze of wiring fans out from controller to each building in which there is a dispense-point. This wiring can be difficult to install, requiring either trenching to bury it or elevated wiring to allow passage of vehicles under it.

f. Due to the necessary wiring, actual dispense points must be near the controller.

g. The only intelligence in the system is the control operator who must queue the jobs and determine when the job has finished pumping (the full quantity may not actually be needed, as when a transmission is being topped off). The operator usually has no visibility when a technician has stopped pumping short of the specified quantity. The operator also does not know if a technician requesting a dispense has walked away from the dispensing station or otherwise abandoned the requisite dispense. The operator is responsible for billing the correct amount of fluid to the correct job, a task which is often imprecisely performed at best.

h. If power to the controller is interrupted, the dispense stops and it may or may not be able to be resumed when power is restored.

i. Present controllers do not start and stop pumps. Pumps are left on and fluid lines are constantly under pressure.

j. Present system have a one-tenth quart step size; each click represents 1/10 quart of fluid.

k. Present systems do not maintain or provide any inventory information. In fact, present systems will initiate a dispense even if there is no fluid in the tank to dispense.

l. Present systems provide no record-keeping or billing information.

m. Present systems provide no password protection or other authorization authentication, and keep no records of who has initiated a dispense.

n. No automatic fire response is included in present systems.

Accordingly, an object of the present invention is to provide a method and system for controlling a dispensing of fluids characterized by the following advantageous features:

a. Allows as many simultaneous dispenses as there are flow meters in the system. If each fluid at each bay has a separate flow meter, all stations may pump all fluids simultaneously.

b. Allows a virtually unlimited number of fluids and stations.

c. Queues all dispenses so that operator attention is only required to initiate the dispense. Automatically sequences dispenses which use the same flow meter without operator intervention.

d. Adding fluids or stations does not require adding anything at the control point.

e. The control PC is linked by radio or telephone to the Remote Controllers (RCs), eliminating a large wiring headache between buildings.

f. Buildings may be separated from the Control point by up to a mile or so with radio-interconnect, or by many miles with telephone interconnect.

g. Intelligence (computers) are placed at two points in the system, greatly reducing operator workload and attention, and avoiding dependence on operator memory.

h. Power interruption at the Control PC does not interrupt or interfere with already-authorized dispenses. The RC will finish them and retain the results in memory until the Control PC comes back on-line. Power interruptions at the RC will cause temporary interruption of operating dispenses because of lose of control of valves and pumps, but the system can be made to pick up where it left off when power is restored.

i. Pumps can be started and stopped with each dispense, or the system can automatically accommodate a "pumps-always-on" system.

j. This system can provide 1/20th quart visibility if symmetric-switched flow meters (equal on and off times) are used.

k. A current inventory, once entered by the operator, is maintained by the system, with re-order indications to the operator at user-controlled inventory points. A dispense cannot be initiated without sufficient inventory on hand.

l. Extensive record-keeping and billing information is available from this system.

m. The system provides password protection at several levels. Each dispense must be authorized by a named person, which is recorded.

n. The system interconnects with the user's fire alarm system, providing automatic shutdown of all pumping in a building which experiences a fire. All fluid dispensed at the time of a fire-induced shutdown is still reported to the Control PC, but pumps and valves are turned off to prevent spraying fire-enhancing fluids from ruptured lines. Alternatively, an automatic fire-extinguishing system may be activated by an RC whose alarm is triggered.

SUMMARY OF THE INVENTION

In accordance with a specific illustrative embodiment of the present invention, a system for controlling a dispensing of materials such as fluids includes at least one metered quantity control apparatus such as a valve apparatus, a central controller and a remote communication link therebetween. The valve apparatus controls a movement of fluid from at least one bulk fluid reservoir through at least one conduit in response to an authorization signal. The central controller establishes an electronic interconnection "map" corresponding to plumbing interconnections between the at least one bulk fluid reservoir and the at least one fluid conduit. The central processor employs the electronic interconnection map to generate the authorization signal which is provided from the central processor to at least one metered valve apparatus via the remote communication link.

In a further aspect of the present invention, the at least one metered valve apparatus generates fluid dispensing signals (indicating quantities of fluid flow) in response to movement of the fluid through the at least one conduit. The central controller further employs the fluid dispensing signals to generate the authorization signal. The central controller includes a storage device for storing system configuration information and transaction records including the electronic interconnection map. The system further includes an operator interface to the central controller for initiating a configuration change to the system configuration information or for providing a visual indication of the system configuration information and the transaction records.

In still a further aspect of the present invention, a method is provided for controlling the dispensing of a fluid. The method includes the steps of:

providing a central controller;

providing at least one remote fluid dispensing station, each station including at least one fluid dispensing conduit, at least one metered valve apparatus for regulating movement of fluids through the at least one fluid dispensing conduit and a processor for controlling the at least one metered valve apparatus, each processor being electrically connected to the central controller via a communication link;

establishing, at the central controller, system configuration information and transaction records including an electronic fluid-station interconnection map corresponding to fluid-station plumbing interconnections between the at least one fluid and the at least one dispensing station; and employing the electronic fluid-station interconnection map to provide from the central controller, via the communication link, an authorization to dispense a predetermined quantity of a selected fluid of the at least one fluid through a selected conduit of the at least one fluid conduit to the processor controlling the metered valve apparatus of the selected conduit.

The scheme described herein is a method for remote control of such operations or processes as dispensing fluids, solids, or other materials, or exercising remote control of systems. The method described does away with the extensive wiring between the point at which the operator exercises control, and the building or place where that control is exerted. It also automates much of the operation, freeing the operator of constant monitoring once the operation has been started. It also contains security features which prevent unauthorized removal of inventory and provides extensive record-keeping of inventory increases and reductions, up-to-the-second inventories, and inventory re-order warnings.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIG. 22 is a detailed block diagram of the remote controller start up procedure;

FIG. 23 is a block diagram of the remote controller scheduler;

DETAILED DESCRIPTION OF THE PREFERRED EMBODIMENTS

Figure 1:
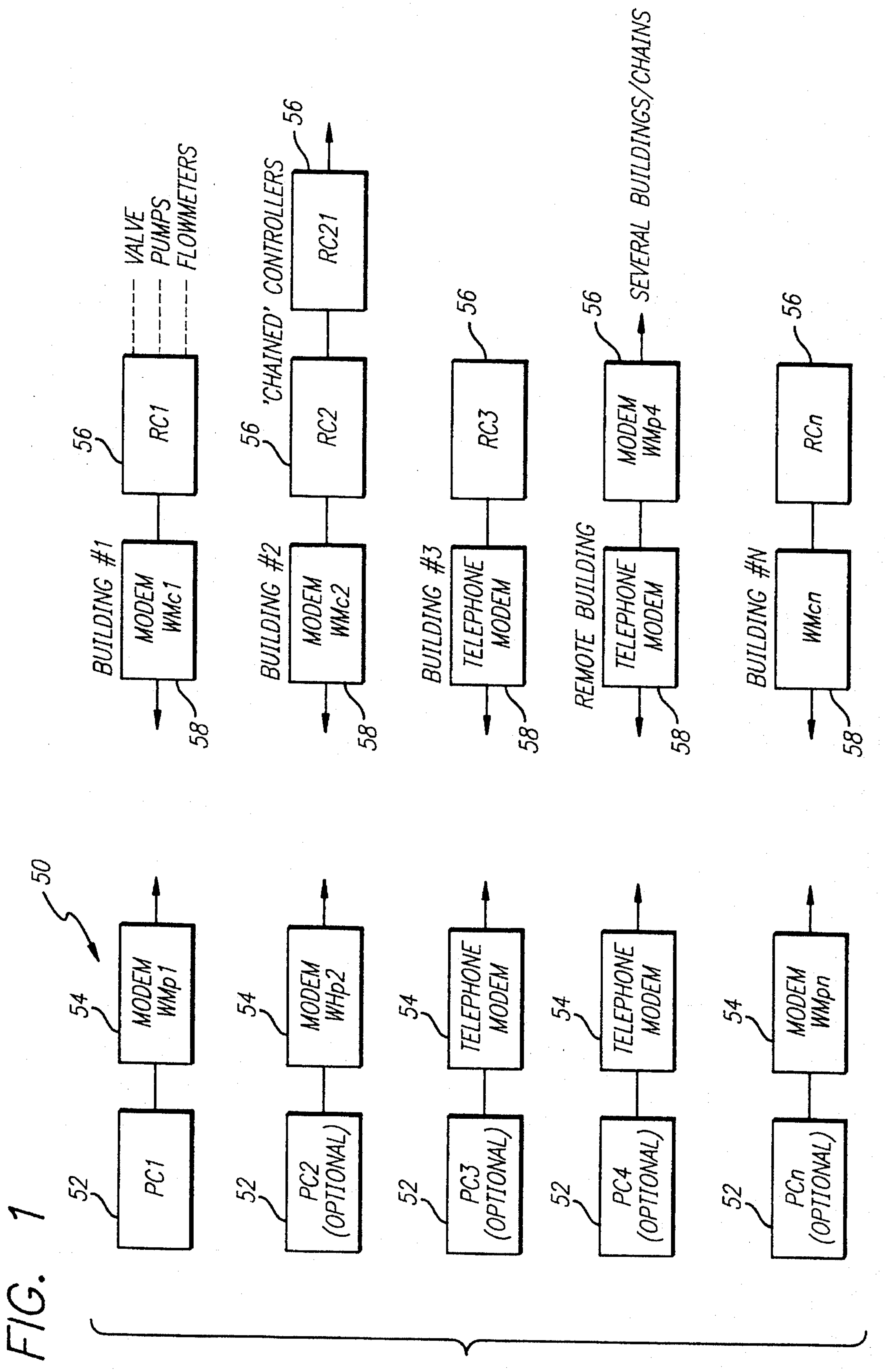
FIG. 1 is a block diagram of the remote control system of the present invention.

FIG. 1 is a block diagram of a remote control system 50. The basic system 50 consists of one or more personal computers, designated as PC1 through PCn, each of which is connected to a wireless modem 54, designated as WMp1 through WMpn, or to one or more telephone lines through telephone modems. At the other end of the radio or telephone link is one or more Remote Controllers 56, designated as RC1 through RCn.

The PC computers 52 include and provide interface(s) with the human operator(s) who control the system. The PC computers 52 execute a control program which is tailored to the particular remote control application.

Within the radio range of wireless modems WMp1 through WMpn, there may be one or more other wireless modems 58 of the same type, designated as WMc1 through WMcn. Each modem 58 is connected to a Remote Controller 56 to provide a communication link between the PCs 52 and the RCs 56.

Alternately, the PCs 52 can be connected to RCs 56 via one or more telephone lines, using telephone modems in place of radio modems. The distance(s) between the PCs 52 and the RCs 56 are not limited by radio transmission range when a telephone interconnect is used. Leased, constantly-connected telephone lines are preferred since dial-up is not normally used.

Any PC 52 can control any. RC which is connected via the communication link or which is chained (e.g., "chained" RC2 and RC21 as shown in FIG. 1) to an RC 56 which is so connected. Similarly, any PC 52 can control any RC 56 which is connected to the communication link via telephone line or telephone modem. For example, a remote complex may be connected to the communication link via telephone modem (e.g., modem WMp4). Such a wireless modem interconnection allows telephone line control of an entire remote building complex via wireless modem.

Figure 2:
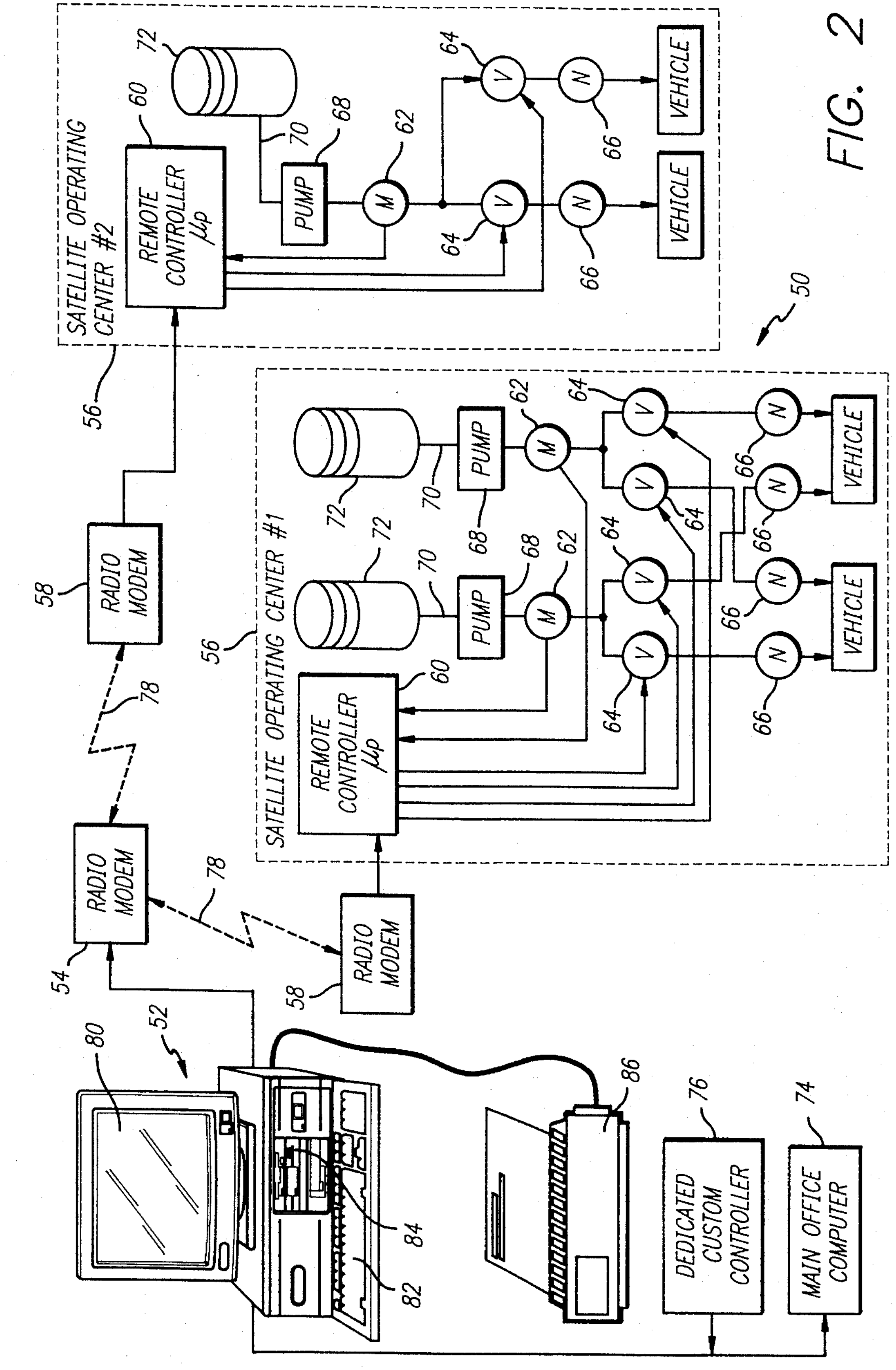
FIG. 2 is a partial block diagram and partial perspective view of the system for controlling a dispensation of fluids.

As shown in FIG. 2, one or more RCs 56 are installed at various places within the installation over which the PCs 52 exercise control. Each RC 56 includes a remote controller or processor 60 and control circuitry containing various measuring equipment (including but not limited to fluid flow meters 62, electric valves 64, technicians dispensing nozzles 66 and other transducers) and output controls or switches. The measuring equipment allows the RC processor 60 to obtain information about the process being controlled, and the output controls or switches allow the processor 60 to exercise local control of these processes. A Remote Controller 56 may be connected either to a wireless modem, to a telephone-line modem, or to another RC 56. Extensive inter-building wiring may be eliminated by providing Remote Controllers 56 in different buildings, or at opposite ends of the same large building, with their own wireless or telephone modems.

Remote Controllers 56 can be utilized singly or can be inter-connected in "chains", or both In a chained system, only the first RCs 56 needs a wireless or telephone modem. Each of the other Remote Controllers 56 in a chain obtains information from the Remote Controller 56 preceding it in the chain. No limit is placed on the number of PCs 52, buildings or Remote Controllers 56.

In a system 50 utilizing several Remote Controllers 52 located at satellite operating centers, each Remote Controller 56 connected to a modem 58 (wireless or telephone) has a unique address, which may be referred to as a "building address". Such addressing distinguishes each Remote Controller chain from the other chains. The second and other Remote Controllers 56 in each chain do not need a building address. However, each RC 56 has a "controller address" which differentiates it from other RCs 56 in the chain. For example, an RC 56 connected to a modem 58 may be designated as "Remote Controller #1" in that building; an RC 56 connected "down-chain" from RC #1 is designated as "Remote Controller #2" at the same building address, another RC connected "down-chain" from RC #2 is designated as "Remote Controller #3", and so on With the exception of the "building address" of the first RC 56 in each chain (which is set, for example, via a plug-in jumper/header), all Remote Controllers 56 are alike; addressing is automatically implemented in the Controller's software.

The PC 52 which provides a user interface to an operator of the system 50 exercises control by generating a "control message" which instructs a particular Remote Controller 56 in the system 50 (e.g., Building #2, Remote Controller #3) to perform a specified operation, such as "dispense 4.5 quarts of 30-weight motor oil at bay #4". The appropriate Remote Controller 56 receives the message and acknowledges it, and executes the order as soon as any prior orders received by it which utilize the same equipment (flow meter, dispense valve, etc.) are cleared. Orders which cannot be executed immediately by a Remote Controller 56 are queued in that RC 56 and executed in turn. In appropriate situations, a priority control message can be sent which causes its execution out-of-turn, before other preceding messages.

According to the present invention, messages pass between a control PC 52 and a Remote Controller 56 without human operator intervention. These messages give the control PC 52 information on the current status of the controlled operation, and, when the operation is finished, give an indication of completion or, perhaps, partial completion or timeout. The messages and the transmission link contain information allowing security and error-checking. The back-and-forth messages pass only between the PC 52 which initiated the operation and the RC 60 to which the operation was addressed.

The operator interface is a PC program which allows the operator to select the operation to be performed and the particular building and location where it will be performed. The PC program allows extensive record-keeping and prevents inventory decrease without a record. Hence, the PC program advantageously stores and updates inventory data and additionally prevents an unauthorized release of inventory.

By way of example, the system 50 may be installed in a large auto-repair facility with several out-buildings, where dispensations of fluids such as automobile motor oil, truck motor oil and automatic transmission fluid are controlled by an operator in the parts department.

A mechanic or technician goes to the parts department or calls in by telephone, indicating that 4.5 quarts of motor oil are needed in service bay #4. The PC computer program automatically knows that motor oil in bay #4 is in building #2 connected to valve X, pump Y, and meter Z (this information has been put into the PC's memory at time of installation, and doesn't need to be known by the human operator). The parts clerk authorizes a dispensation of 4.5 quarts of motor oil to bay #4 by sending a message to building #2, controller #1. If someone was already dispensing motor oil using the same flow meter (although at a different bay), the controller would queue the message until the flow meter was no longer in use on that prior dispense. When the earlier dispense was finished, the controller would activate bay #4's valve X and pump Y, and would illuminate a light on the dispense reel to notify the mechanic. The RC 56 also informs the PC 52 that this dispensation was "enabled". When the mechanic starts pumping by inserting the nozzle in a car engine and pulling the trigger release, the RC 56 notifies the PC 52 that the job is "pumping" and keeps track of how much is dispensed by, for example, 1/10 quart increments by reading flow meter Z to determine when pumping started and how much was pumped. The RC 56 turns off the valves (and pump, if necessary) after 4.5 quarts are dispensed, and notifies the PC 52 of completion. If the mechanic stopped pumping before 4.5 quarts had been dispensed, the Remote Controller 56 continues to monitor flow (or non-flow, in this case) for a specified period of time, and then notifies the PC 52 of a partial dispense completion by timeout, with a report of how much was actually dispensed. The amount dispensed is automatically subtracted from the PC-kept inventory, and the appropriate job order is debited with the amount of oil actually pumped.

The Fluid Control System 50 preferably uses one Control PC 52 as a control point and can queue a large number of jobs, limited only by the capacity of memory devices within the PCs 52, the RCs 56 or elsewhere.

No wires connect the Control PC 52 with the various out-buildings where fluids are dispensed. As discussed above, either a radio data modem or a telephone line is used to connect the Control PC 52 with the buildings, which may be located nearby or, by telephone connection, miles away. The useful range of currently-approved radio data modems is about one mile line-of-sight.

The processors 60 of the Remote Controllers 56 provide intelligence in the form of an embedded—microprocessor "computer", for example, which gives the RCs 56 a measure of autonomy. When the Control PC 52 broadcasts a dispense message, all buildings receive the message but only the addressed Remote Controller 56 in the appropriate building responds to the message. A positive-ACK system is included to assure that both ends of the communication acknowledge messages, or the message is resent. The Remote Controller 56 immediately enables the dispensation and illuminates a light at the dispense position to inform the operator, if there are no conflicts. A conflict exists when a necessary element (e.g., the flow meter 62) is in use in an already-proceeding job. If there is a conflict, the RC 56 queues the job with a received time-stamp.

When a job is started, the necessary pump 68 (which is connected via a fluid conduit 70 to a bulk fluid reservoir 72) is also started if the operator elects to leave pumps 68 off until needed rather than leaving the pumps 68 on the full work-day. A pump 68 is left on until a dispensation is finished. Since some fluid dispense systems use one pump per fluid on a line which might service several bays, a pump 68 is not turned off at the end of a fluid dispensation if another already-in-progress dispensation is employing that same pump 68.

As soon as the present job is finished, the next job in time order which uses that flow meter 62 will be activated automatically by the RC 56. A priority system in included to allow the operator to send out a job which will take priority; it will be the next job executed (using a specified flow meter 62) regardless of when it is received. The fluid dispensation continues until finished or until pumping has stopped for a user-specified period of time (a "timeout"). A timeout is also used for pumping initiation; if a technician has not started to pump within a user-specified time, the RC 56 will abandon the dispensation (either discarding it or moving it down one in the queue, or to the end of the queue). Each of these two timeout values is independently user-selectable.

When the RC 56 finishes a dispensation (either by timeout or by pumping the authorized quantity), the RC 56 notifies the Control PC 52 of the quantity actually dispensed (step size may be 1/20 quart).

In summary, the Control PC 52:

1) serves as the user interface to initiate a dispense;

2) maintains an inventory of quantity of each fluid, notifying the operator of re-order points and preventing dispensations in excess of the quantity of each fluid actually on hand;

3) provides billing information to assure the correct quantity of all dispensed product is billed to the appropriate account;

4) provides a sophisticated system of reports for business managers;

5) prevents theft or "shrinkage" of fluid inventory by requiring a proper account or repair order for each dispensation and authorization for the dispensation, and tracks who initiates each dispensation;

6) maintains the complete wiring and plumbing system in memory, presenting it to the operator in a user-friendly way so that the operator does not need to know which switch position controls what; by bay and fluid, or by technician, and the computer translates this into valves, pumps, and flow meters;

7) presents to the operator an instant status of all jobs presently authorized;

8) maintains a record of dispensations until the operator has individually or collectively closed out completed dispensations into the appropriate work orders. If an operator wishes, the Control PC 52 can be interfaced with an existing accounting computer 74 to provide automatic data entry of transaction information. A custom-programmed interface to the accounting computer 74 may be provided or the accounting computer 74 may be configured to recognize a generic report prepared by the Control PC 52. Similarly, a dedicated custom controller 76 may be interfaced to the Control PC 52.

Further with reference to FIG. 2, a communication link 78 is shown in dashed lines between the radio modem 54 and the radio modems 58. The PC 52 includes a visual display or monitor 80 and a keyboard 82 providing a user interface. The PC program is loaded into a memory device within the PC 52 via a disk drive 84. Additionally, the PC 52 is electronically connected to a printer 86 for obtaining hard copies of information provided at the operator interface.

Figure 3A:
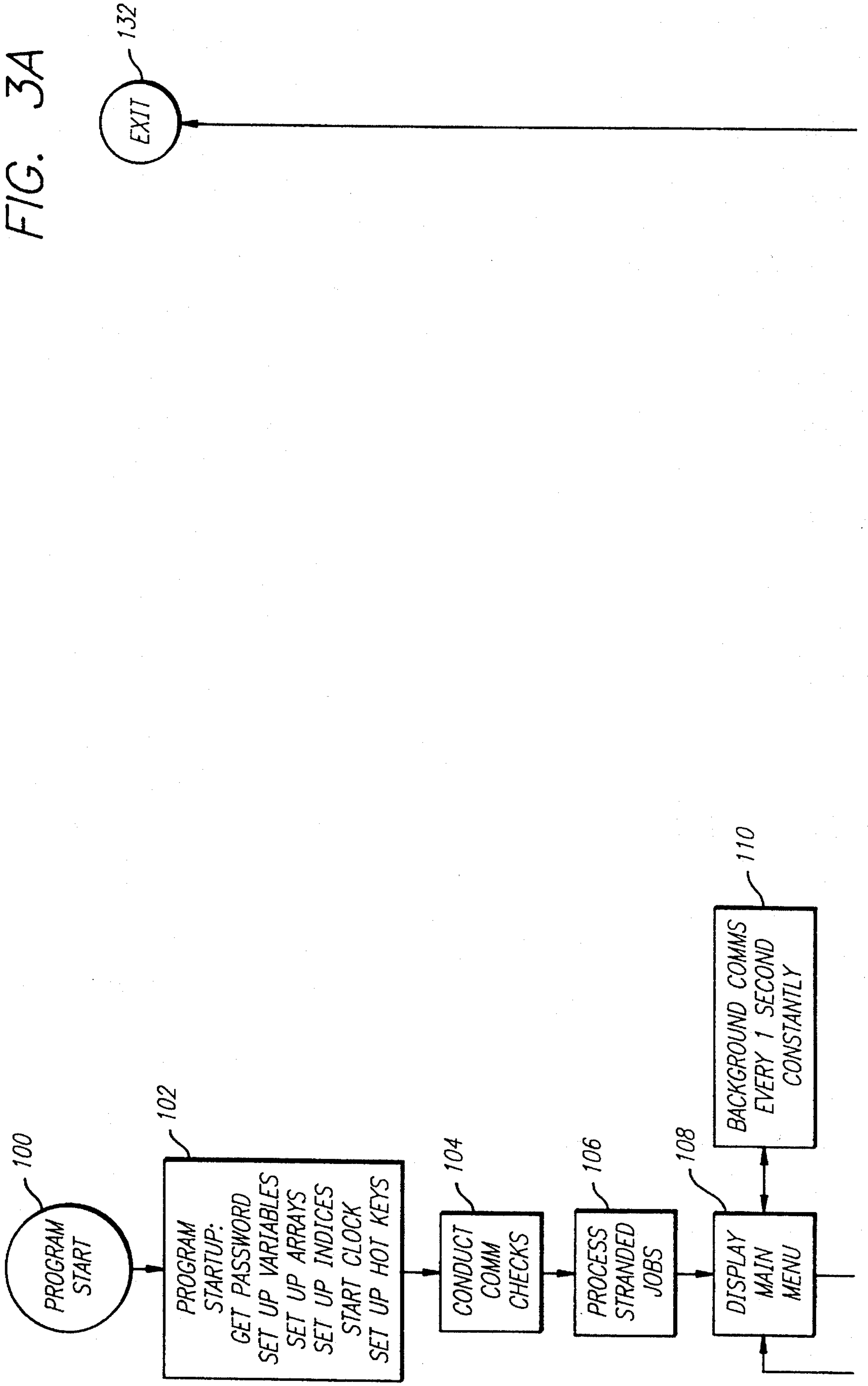
FIGS. 3A, 3B, 3C are an overview block diagram of the PC control program.
Figure 3B:
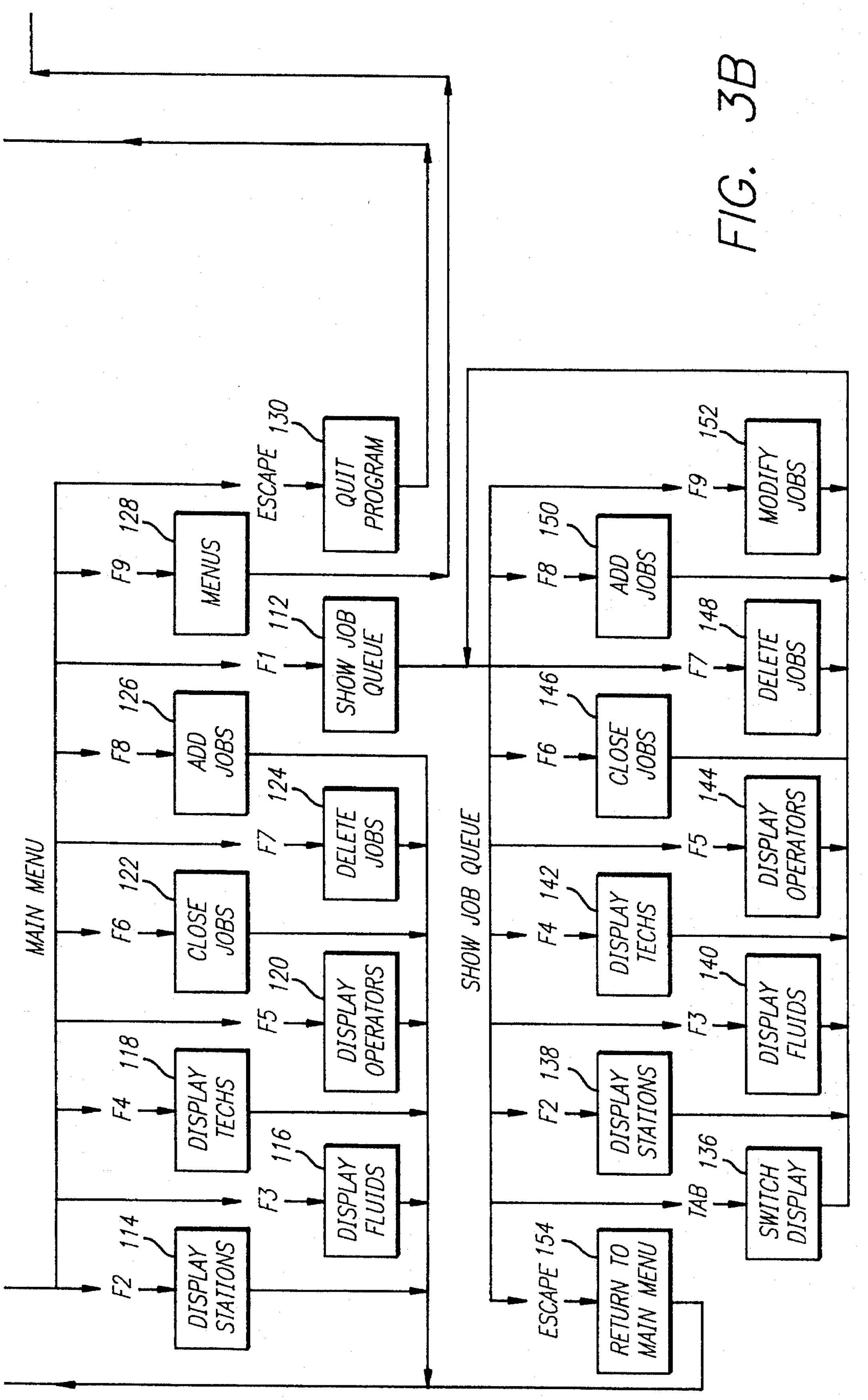
Figure 3C:
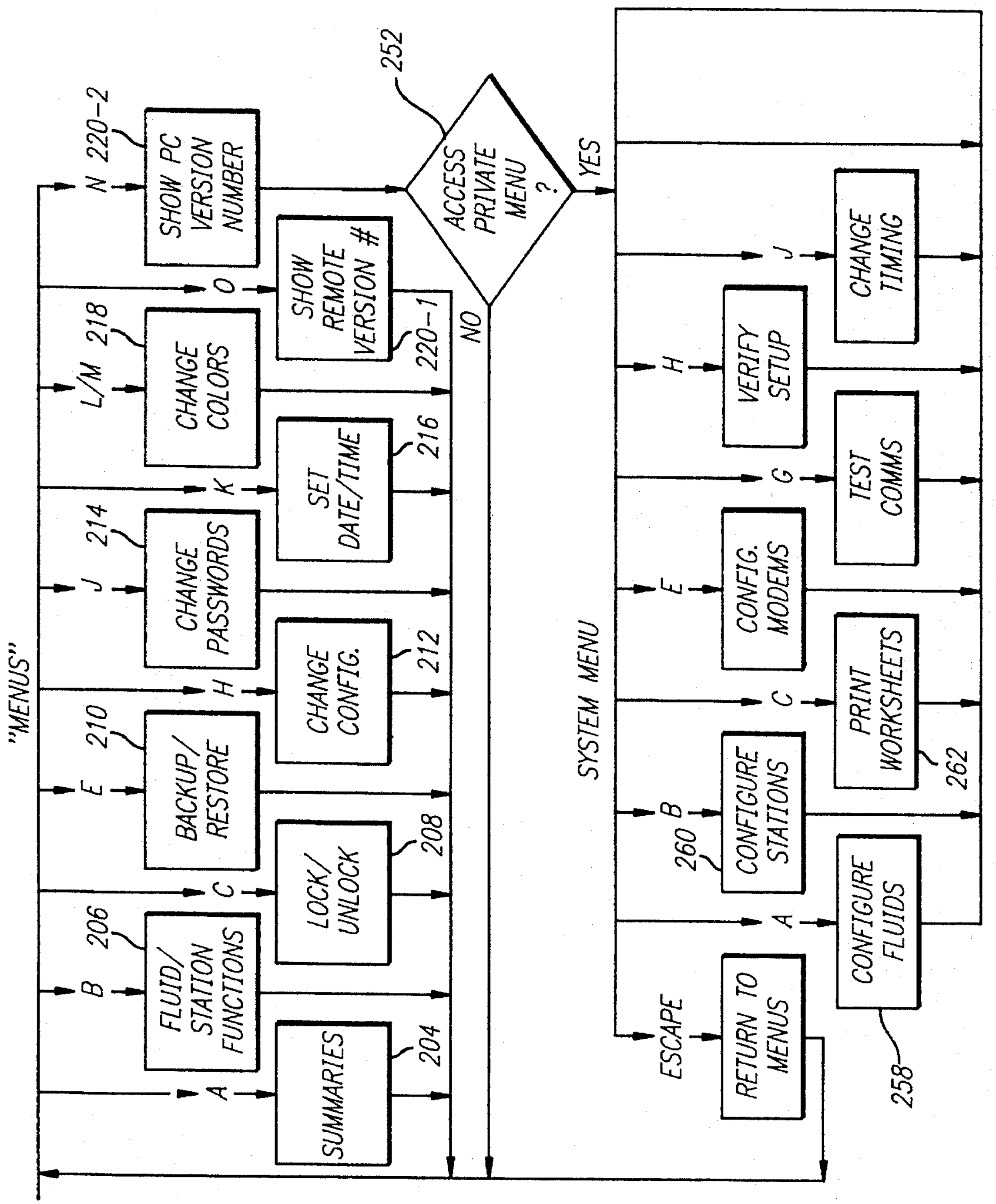

FIGS. 3A, 3B and 3C provide an overview block diagram of the PC control program. After a program start 100 a program start up block 102 is executed. After comm checks are performed at block 104, stranded jobs are processed at block 106. Next, the PC control program proceeds to the display main menu block 108. Block 110 provides that the background comms are checked every second. As may be readily appreciated, other appropriate time intervals may be employed.

As shown in FIG. 3B, the function keys of the keyboard 82 are set up or programmed so that the operator can easily direct operation of the PC control program as desired. If function key F1 is selected, the PC control program proceeds to the show job queue block 112. If function key F2 is selected, a display stations block 114 is executed. If function key F3 is selected, a display fluids block 116 is executed. If function key F4 is selected, a display text block 118 is executed. If function key F5 is selected, a display operator's block 120 is executed. If function day F6 is selected, a close jobs block 122 is executed. If function key F7 is selected, a delete jobs block 124 is executed. If function F8 is selected, an add jobs block 126 is executed. If function key F9 is selected, the PC control program executes a menus block 128 providing the operator with a sub-menu of options. If the escape key is selected, a quit program block 130 initiates an exit from the PC control program 132 to the operating system of the PC 52.

Figure 4:
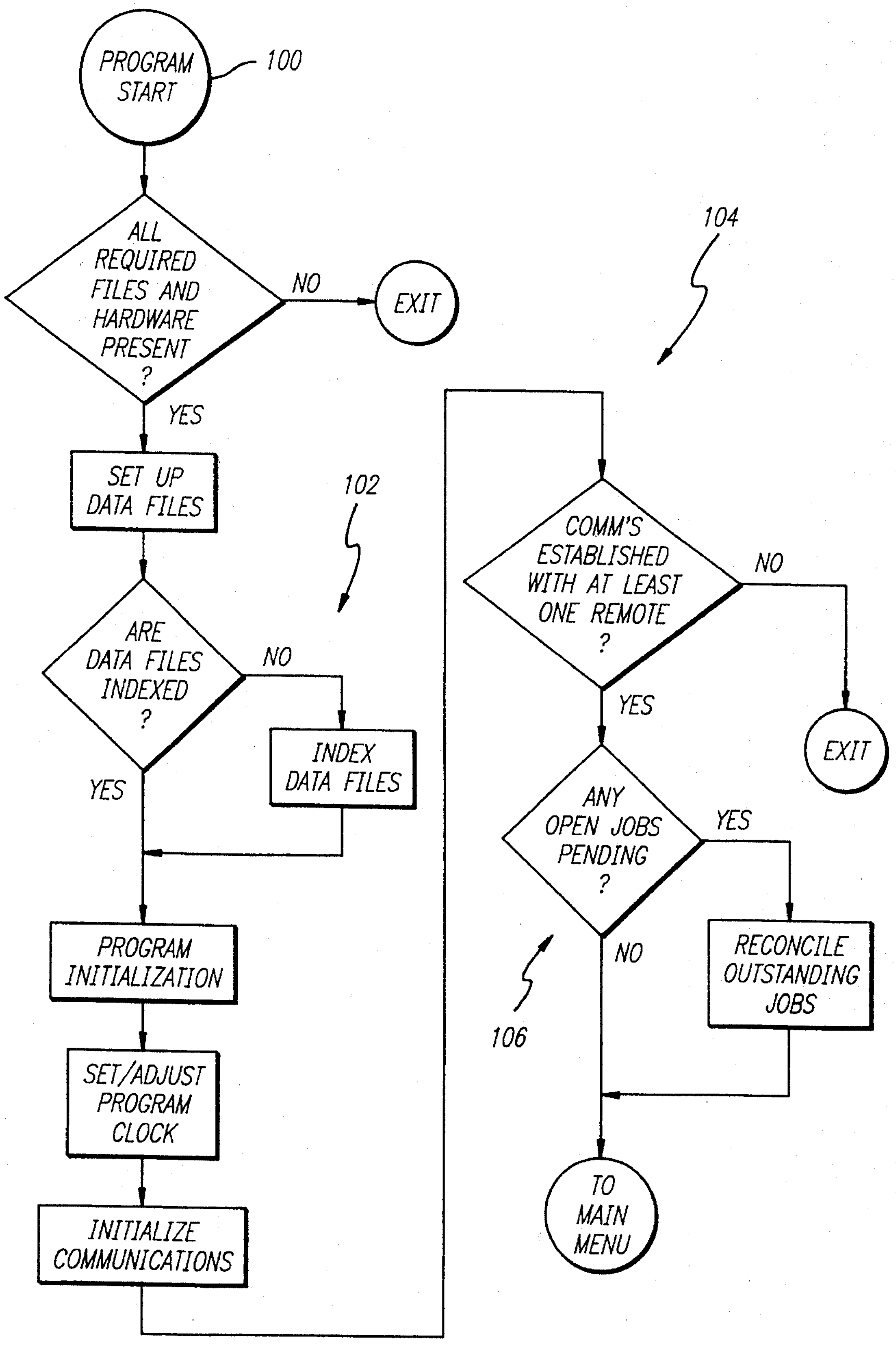
FIG. 4 is a detailed block diagram of the PC control program start up, comm check and stranded job processing routines.
Figure 5:
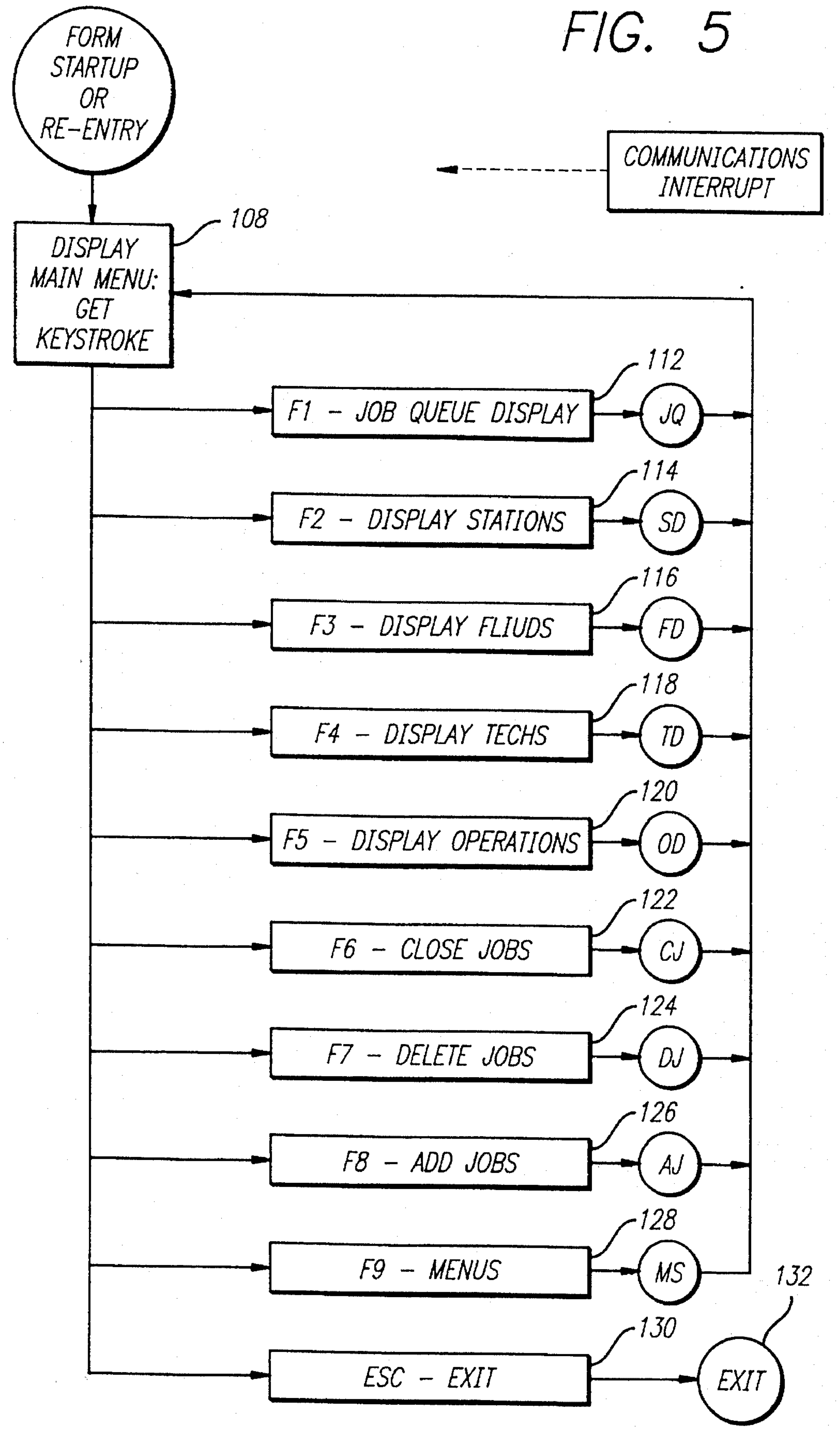
FIG. 5 is a block diagram of the PC control program main menu.

FIG. 4 shows executable blocks 100, 102, 104 and 106 are shown in greater detail. Similarly, FIG. 5 shows in greater detail how the function keys are used to direct execution of the PC control program into various subroutines and that the operator is returned to the main menu after execution of the selected subroutine.

With reference to FIG. 3B, a show job queue menu is presented to the PC operator with execution of the show job queue block 112. As with the main menu, the PC control program is written to assign various program subroutines to different function keys as desired. Accordingly, it should be appreciated that other keys of the keyboard 82 may be appropriately dedicated for use by the operator or that alternative user interfaces such as touch screens, cursors driven by movement of a mouse device, voice recognition systems, light sensitive devices or the like may be used by the PC operator to initiate execution of a desired program subroutine.

Figure 6:
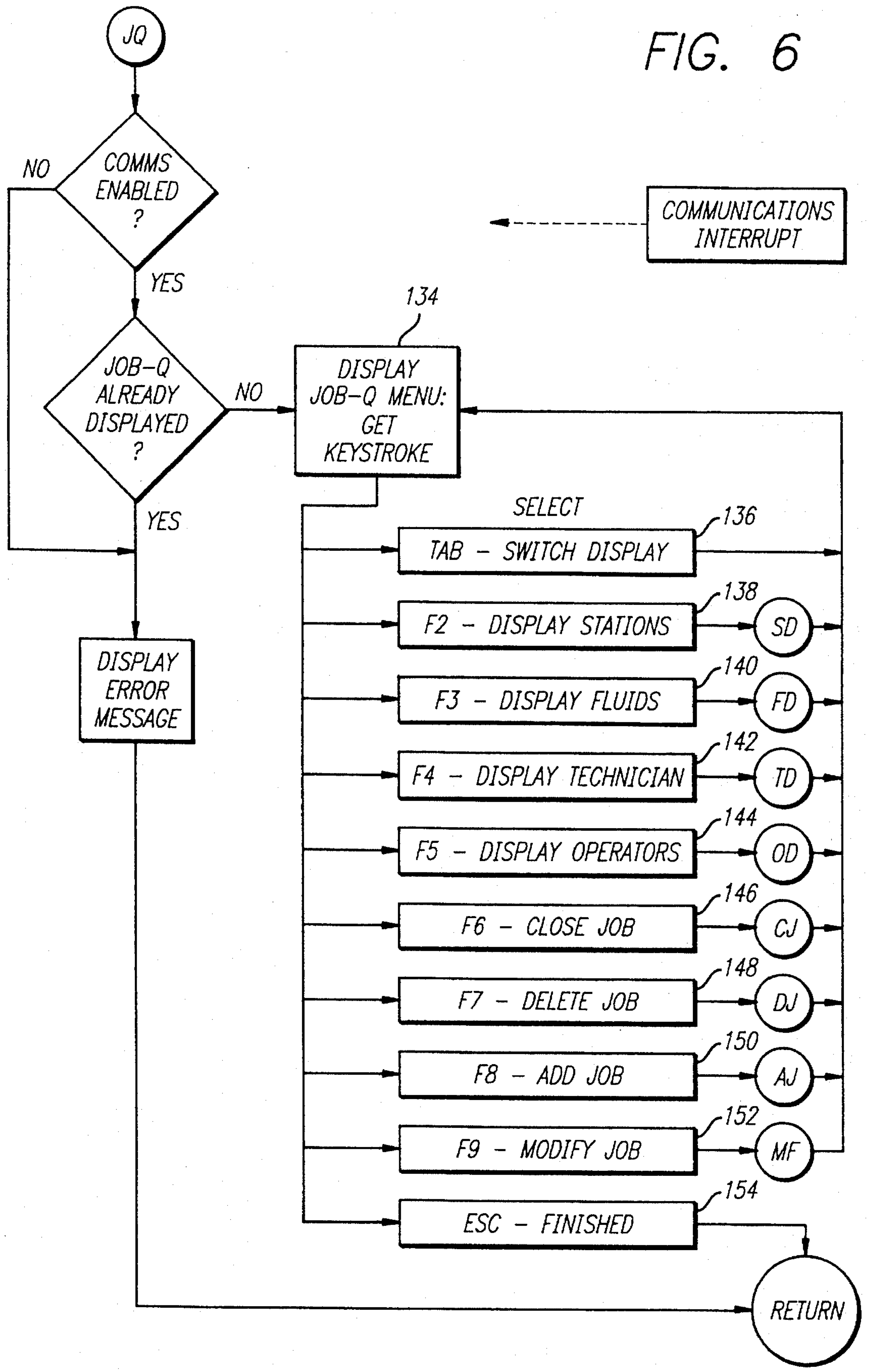
FIG. 6 is a detailed block diagram of the PC control program show job queue menu.

Once in the show job queue submenu, shown in the bottom half of FIG. 3B, a display job queue menu 134 shown in FIG. 6 is executed. The following description of FIG. 6 also describes the bottom half of FIG. 3B. From executable block 134, the PC operator is able to access information about fluid dispensing jobs by station, fluid type, technician and operator. Additionally, the operator may close, delete, add and modify jobs from this menu. If the tab key is selected at block 136, the operator is returned to the show job queue menu. If the function key F2 is selected, a display stations block 138 is executed. If the function key F3 is selected, a display fluids block 140 is executed. If the function key F4 is selected, a display technician block 142 is executed. If the function key F5 is selected, a display operators block 144 is executed. If the function key F6 is selected, a close job block 146 is executed. If the function key F7 is selected, a delete job block 148 is executed. If the function key F8 is selected, an add job block 150 is executed. If the function key F9 is selected, a modified job block 152 is executed. If the escape key is selected, a return to main menu block 154 is executed.

Figure 7:
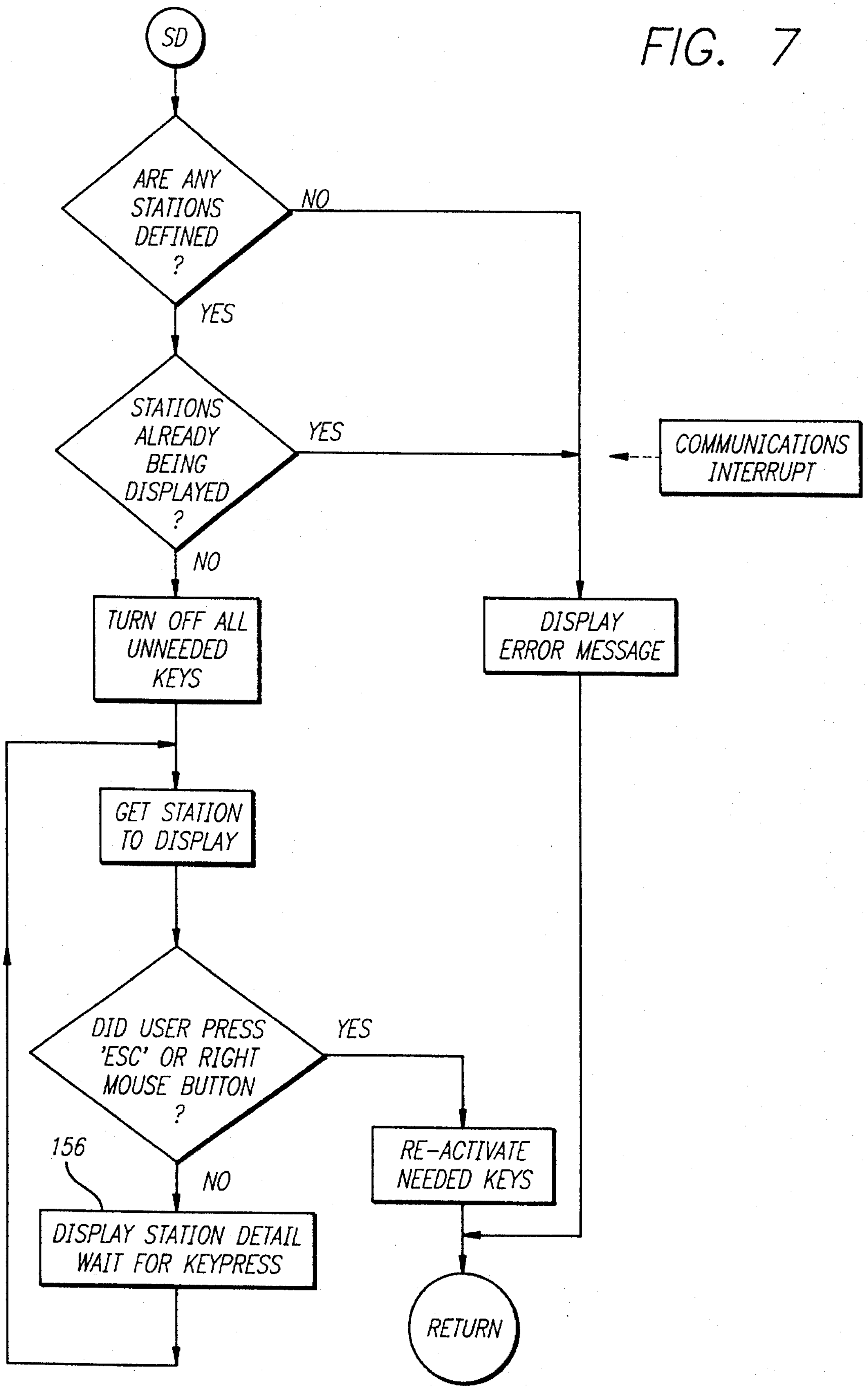
FIG. 7 is a detailed block diagram of the PC control program display stations subroutine.

Other subroutines executable from the main menu are now discussed. FIG. 7 shows a detailed block diagram of the PC control program display stations subroutine. A display station detail block 156 of the display stations subroutine, allows the PC operator to obtain information about a selected station. Such information includes the identity of the technician working at the station, a description of jobs being performed at the station and of jobs waiting to be performed at the station, the nature of these jobs (i.e., what type of fluid is to be dispensed, the quantity to be dispensed, etc.), and the current prioritization of the pending jobs.

Figure 8:
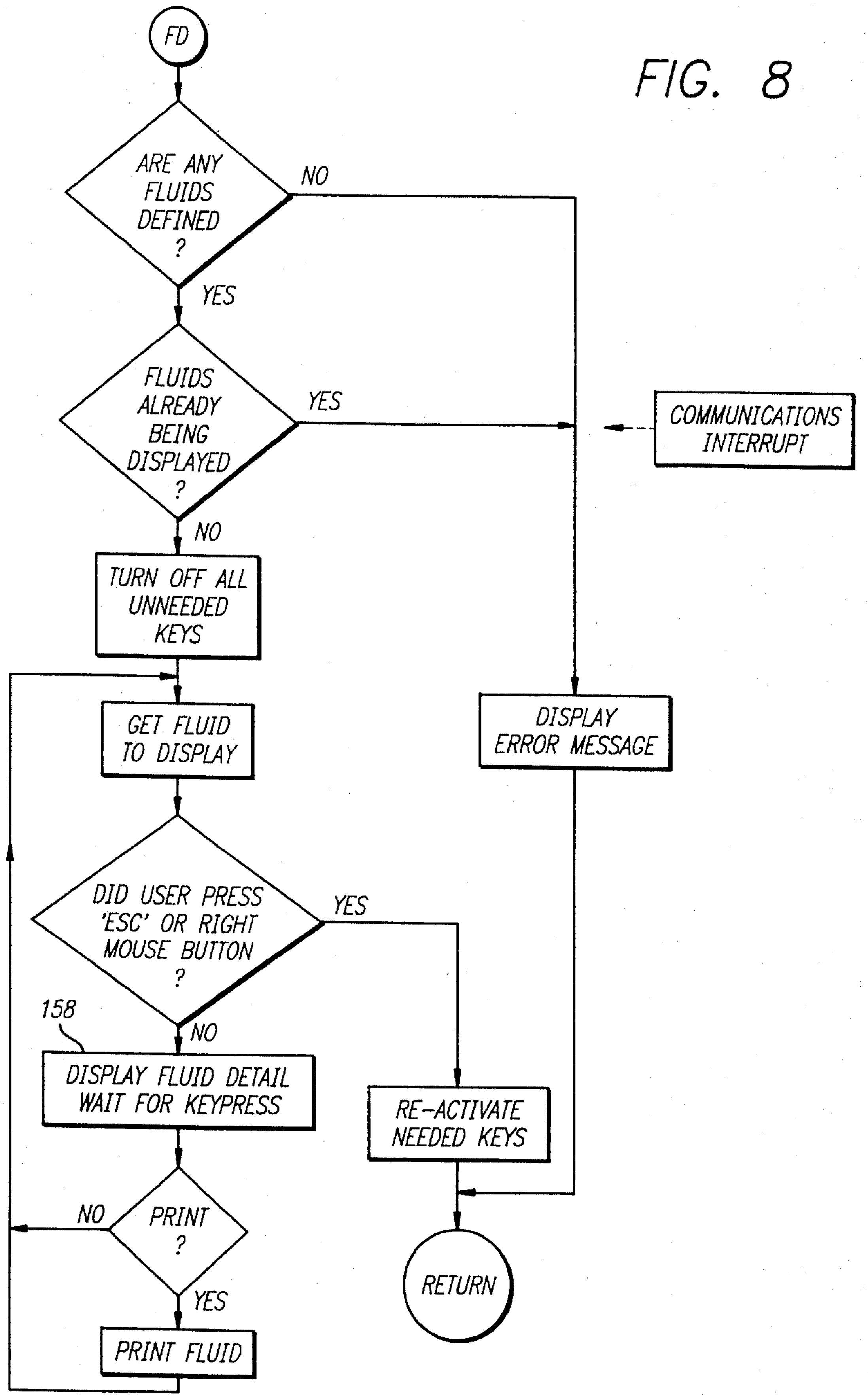
FIG. 8 is a detailed block diagram of the PC control program display fluids subroutine.

FIG. 8 shows a detailed block diagram of the PC control program display fluids subroutine. During execution of the display fluid detail block 158 in the display fluids subroutine, the PC operator is provided with an interface whereby information about the various bulk fluids may be accessed. The PC 52 maintains records of all fluid dispensations and uses these records to appropriately adjust baseline bulk fluid inventories.

Figure 9:
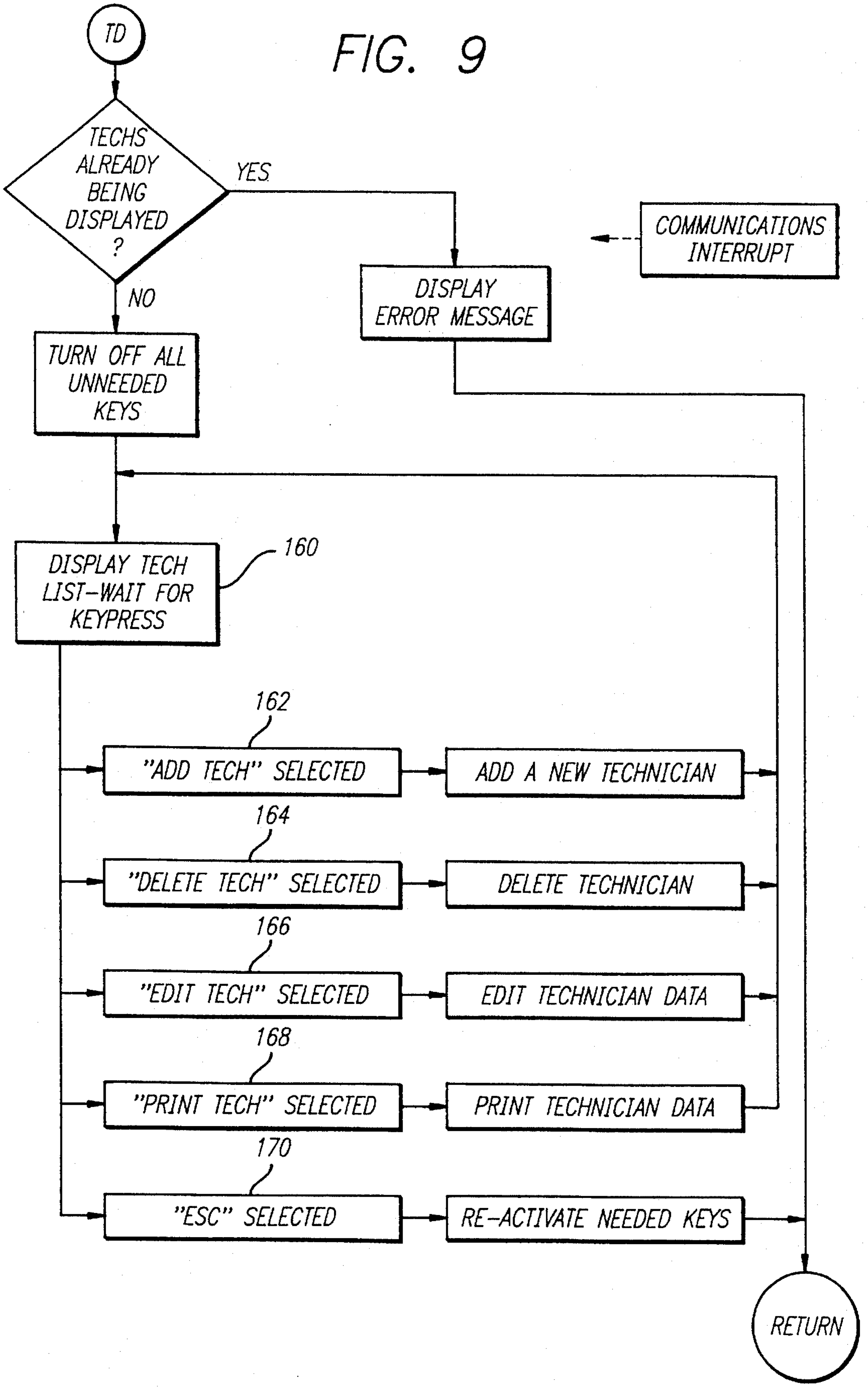
FIG. 9 is a detailed block diagram of the PC control program display technicians subroutine.

FIG. 9 is a detailed block diagram of the PC control program display technicians subroutine. During execution of a display tech list block 160 of the display technicians subroutine, the PC operator is provided with information about the technicians and with a user interface for manipulating such information. After a technician is selected from the list provided during execution of block 160, the add tech selected block 162 allows the PC operator to assign the selected technician to a particular work station. A delete tech selected block 164 allows the PC operator to enter information into the system showing that a technician has finished his or her shift or has left the station for lunch, a coffee break or for some other reason. An edit tech selected block 166 allows the PC operator to change the identity of a technician at a particular work station at a shift change. A print tech selected block 168 prints or otherwise makes available data pertaining to the selected technician. For example, block 168 may be programmed to print information about all fluid dispensations performed by the selected technician during a particular day. Additionally or alternatively, block 168 may provide access to cumulative information pertaining to the selected technician such as a history of completed jobs, hours worked, etc. An escape selected block 170 returns the PC operator to the main menu.

Figure 10:
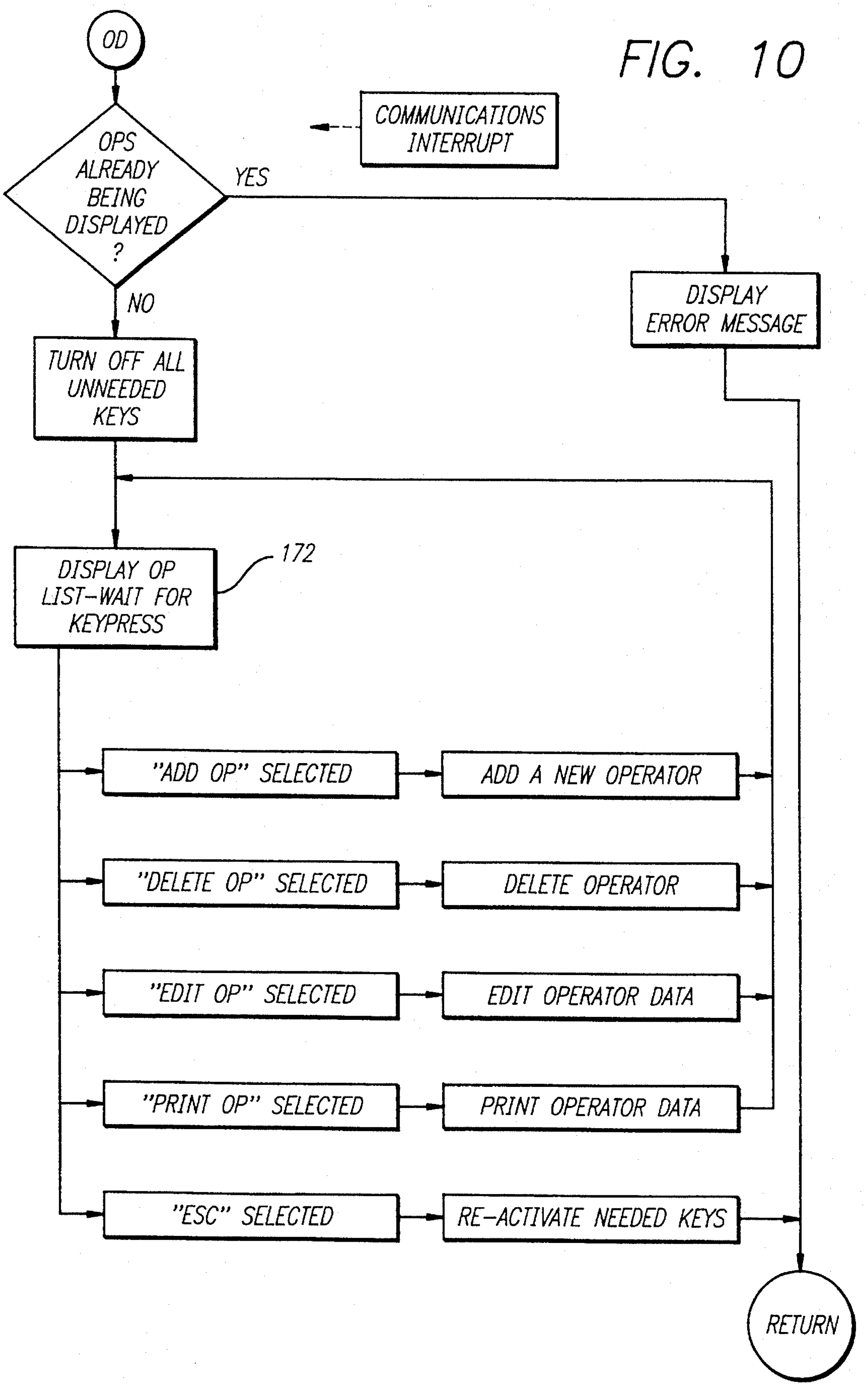
FIG. 10 is a detailed block diagram of the PC control program display operations subroutine.

FIG. 10 shows a detailed block diagram of the PC control program display operator's subroutine. During execution of a display operator list block 172, the PC operator is able to view information about the various PC operators and to edit this information. The display operator's subroutine is substantially identical to the display technician's subroutine and, for the sake of brevity, will not be further discussed.

Figure 11:
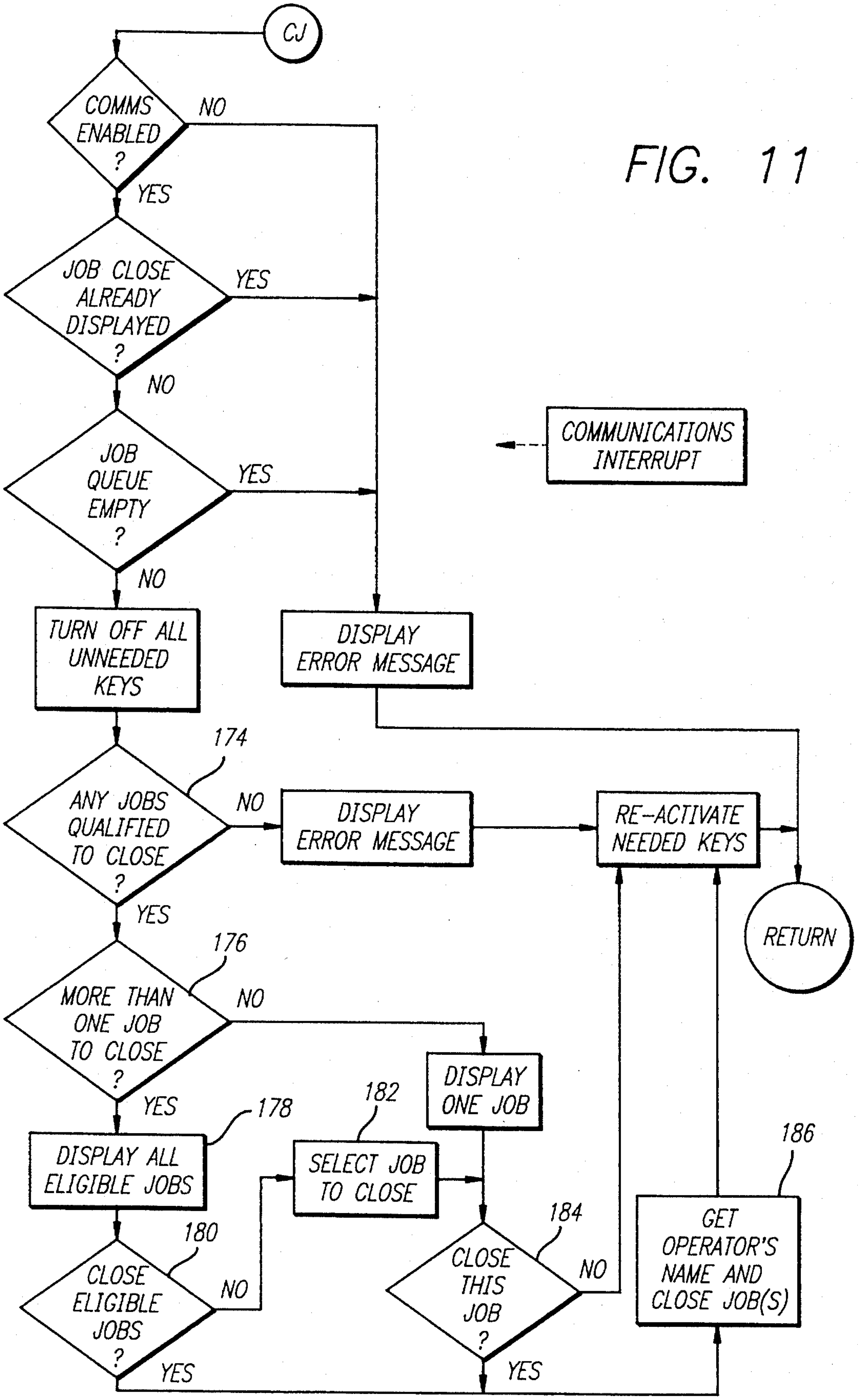
FIG. 11 is a detailed block diagram of the PC control program close jobs subroutine.

FIG. 11 is a detailed block diagram of the PC control program close jobs subroutine. A decisional diamond 174 determines whether or not any jobs are qualified to close. A job which is qualified to close is one which has been pumped to completion. If at least one job is completed, the close jobs subroutine proceeds to a more than one job to close diamond 176. A display eligible jobs block 178 is executed if more than one job has been pumped to completion. If fewer than all of the jobs eligible to be closed are to be closed, a decisional diamond 180 directs further execution of the close jobs subroutine to a select job to close block 182. After a final decision by the operator is made to close a job at diamond 184, the operator enters his or her name and the job is closed at executable block 186.

Figure 12:
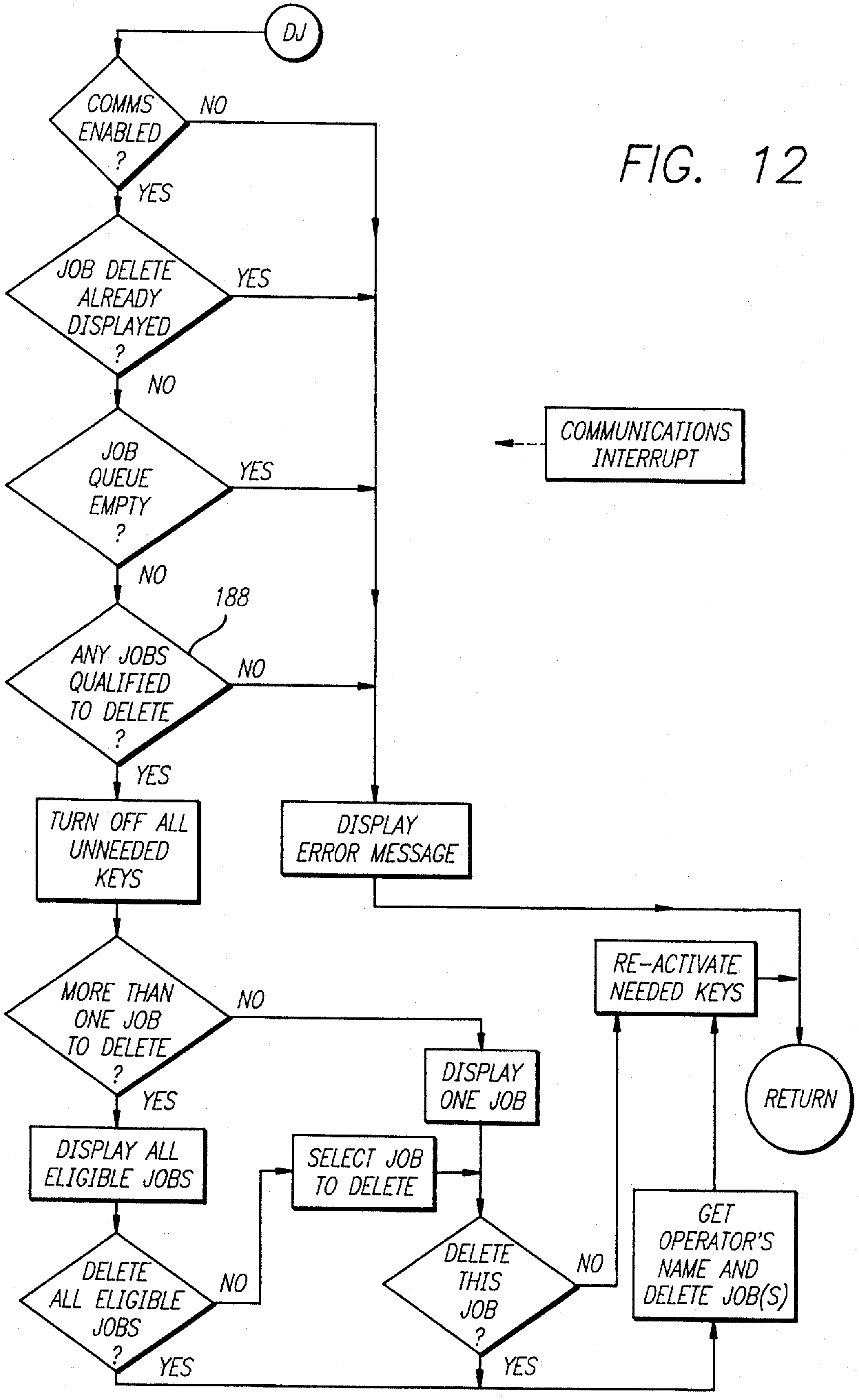
FIG. 12 is a detailed block diagram of the PC control program delete jobs subroutine.

FIG. 12 is a detailed block diagram of the PC control program delete jobs subroutine. A decisional diamond 188 determines whether or not any jobs are qualified to be deleted. A job which is qualified to be deleted is a job which was never pumped. Subsequent executable blocks and decisional diamonds in FIG. 12 are substantially identical to those of FIG. 11.

Figure 13:
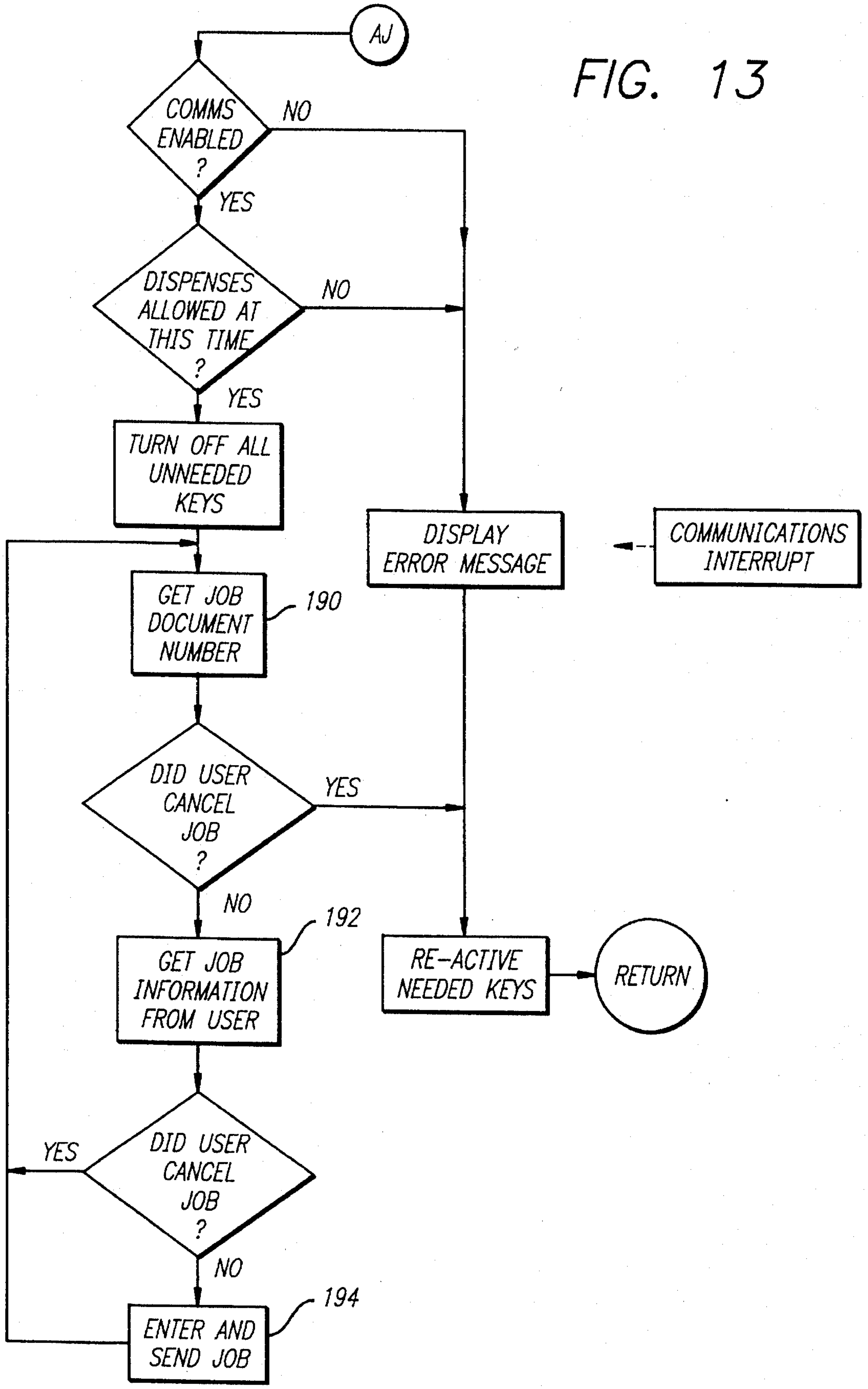
FIG. 13 is a detailed block diagram of the PC control program add jobs subroutine.

FIG. 13 is a detailed block diagram of the PC control program add jobs subroutine. After execution of a get job document number block 190, the program add jobs subroutine determines whether or not the PC operator has cancelled the job. If not, a get job information from user block 192 is executed thereby providing an interface through which the operator can enter information to add a job. If the entered job is not cancelled, an enter and send job block 194 is then executed.

Figure 14:
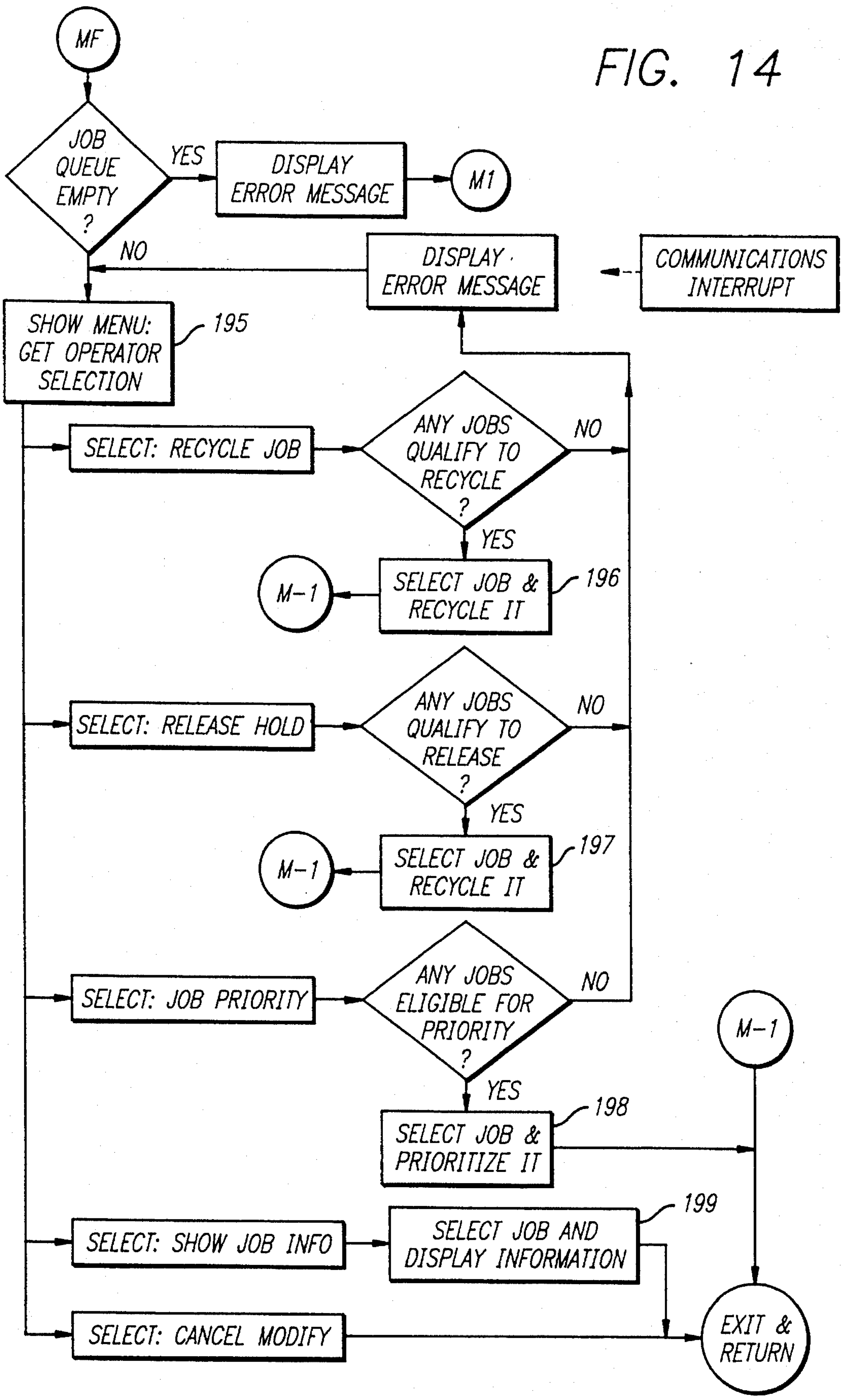
FIG. 14 is a detailed block diagram of the PC control program modify jobs subroutine.

FIG. 14 is a detailed block diagram of the PC control program modify job subroutine. A show menu: get operator selection block 195 provides the PC operator with an interface whereby queued jobs may be modified. Through selection of appropriately dedicated keys, the operator can direct the PC control program to recycle a "no start" job which was authorized but not commenced before a time out condition occurred. Such "no start" jobs are stored in a memory device of the PC 52 and may be recycled through execution of a select job and recycle it block 196. When a job is to be released from the queue so that it may be started by the technician, the PC operator selects the appropriate key to execute a select job and release it block 197. If the priority of the queued jobs is to be modified, the PC operator selects an appropriate key to direct the program modify job subroutine toward execution of a select job and prioritize it block 198. The program modify job subroutine additionally includes a select job and display information block 199.

Figure 15:
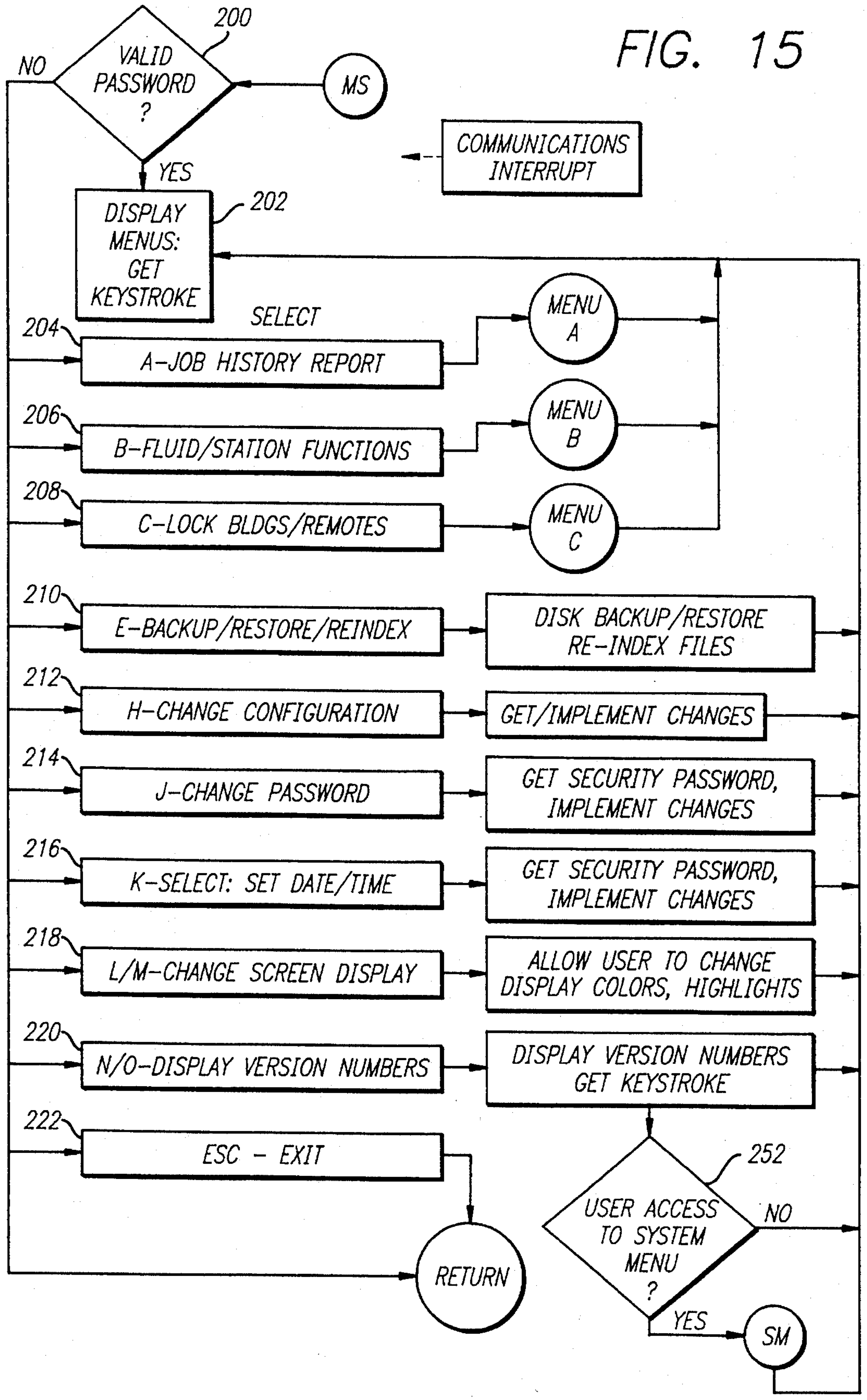
FIG. 15 is a detailed block diagram of the PC control program "menus" menu.

FIG. 15 is a detailed block diagram of the PC control program "menus" shown in the top half of FIG. 3C. The following description of FIG. 15 also describes the top half of FIG. 3C. After the menus block 128 from the main menu is selected, the PC control program queries the operator for a valid password at diamond 200. After a valid password is entered by the operator, a display menus block 202 is executed. From the "menus" display, the PC control program responds to selections by the operator of various keys from the keyboard 82. If the A key is selected, a job history report or summaries block 204 is executed. If the B key is selected, a fluid/station functions block 206 is executed. If the C key is selected, a lock buildings/remotes block 208 is executed. If the E key is selected, a backup/restore/reindex block 210 is executed. If the H key is selected, a change configuration block 212 is executed. If the J key is selected, a change passwords block 214 is executed. If the K key is selected, a set date/time block 216 is executed. If the L or M keys are selected, a change screen display or change colors block 218 is executed. If the N or O keys are selected, a display version numbers block 220 is executed. If the escape key is selected, an exist block 222 is executed returning the operator to the main menu.

Figure 16:
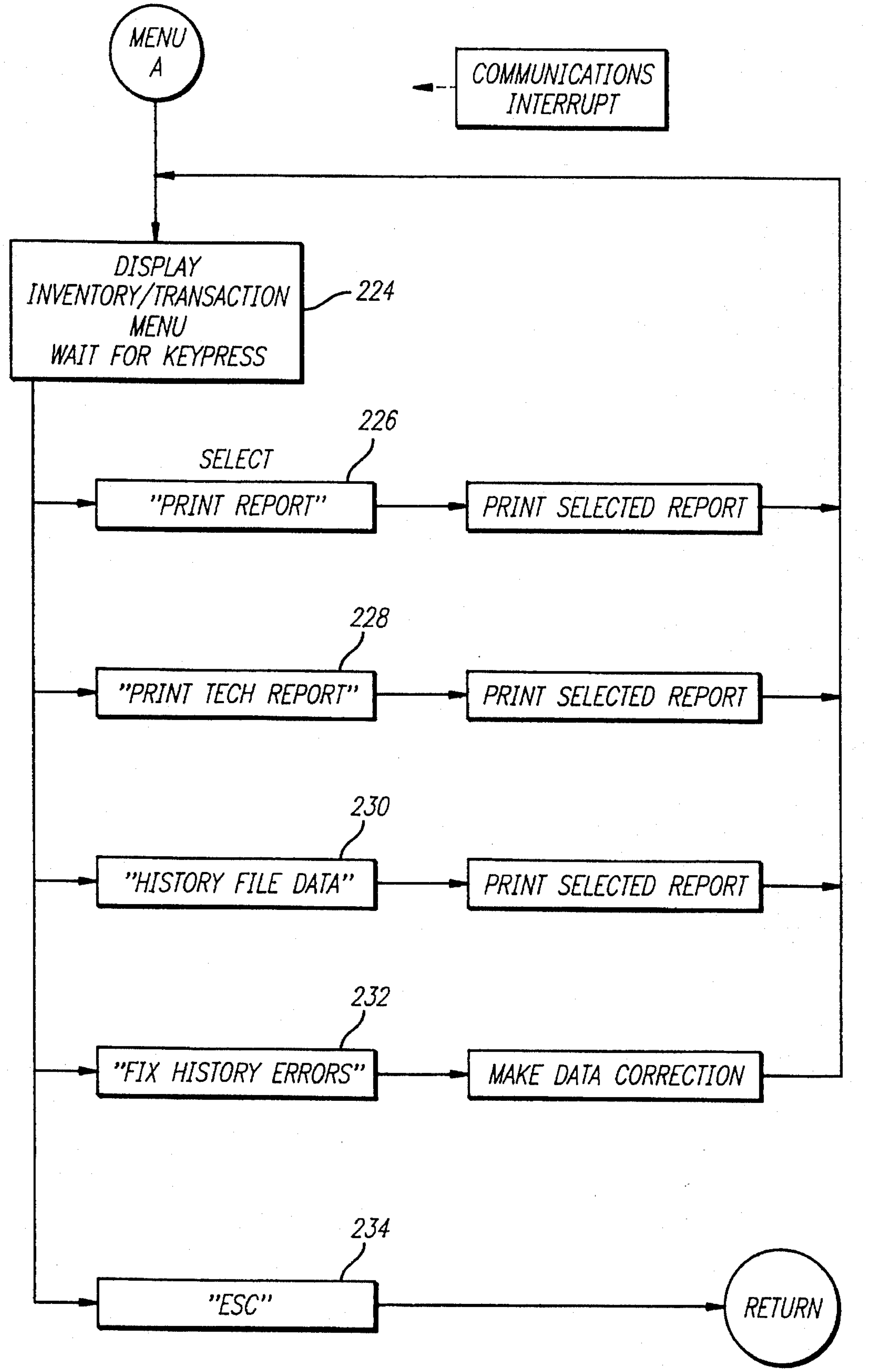
FIG. 16 is a detailed block diagram of the PC control program menu A subroutine.

FIG. 16 is a detailed block diagram of the PC control program menu A subroutine. After the PC operator selects the A key from the "menus" display, a display inventory/transaction menu block 224 is executed. The menu A subroutine allows the PC operator to initiate, through the appropriate key selection, execution of a print report block 226. Reports generated from execution of block 226 include inventory and transaction reports. The PC operator may also select an appropriate key to execute a print tech block 228 which allows a report pertinent to a selected technician to be printed. Similarly, a file history data block 230 provides a job history report or the like when executed. When a fix history errors block 232 is executed, the PC operator is presented with an opportunity to correct erroneous data discovered in displayed job histories. If the escape block 234 is executed, the PC operator is returned to the "menus" display.

Figure 17:
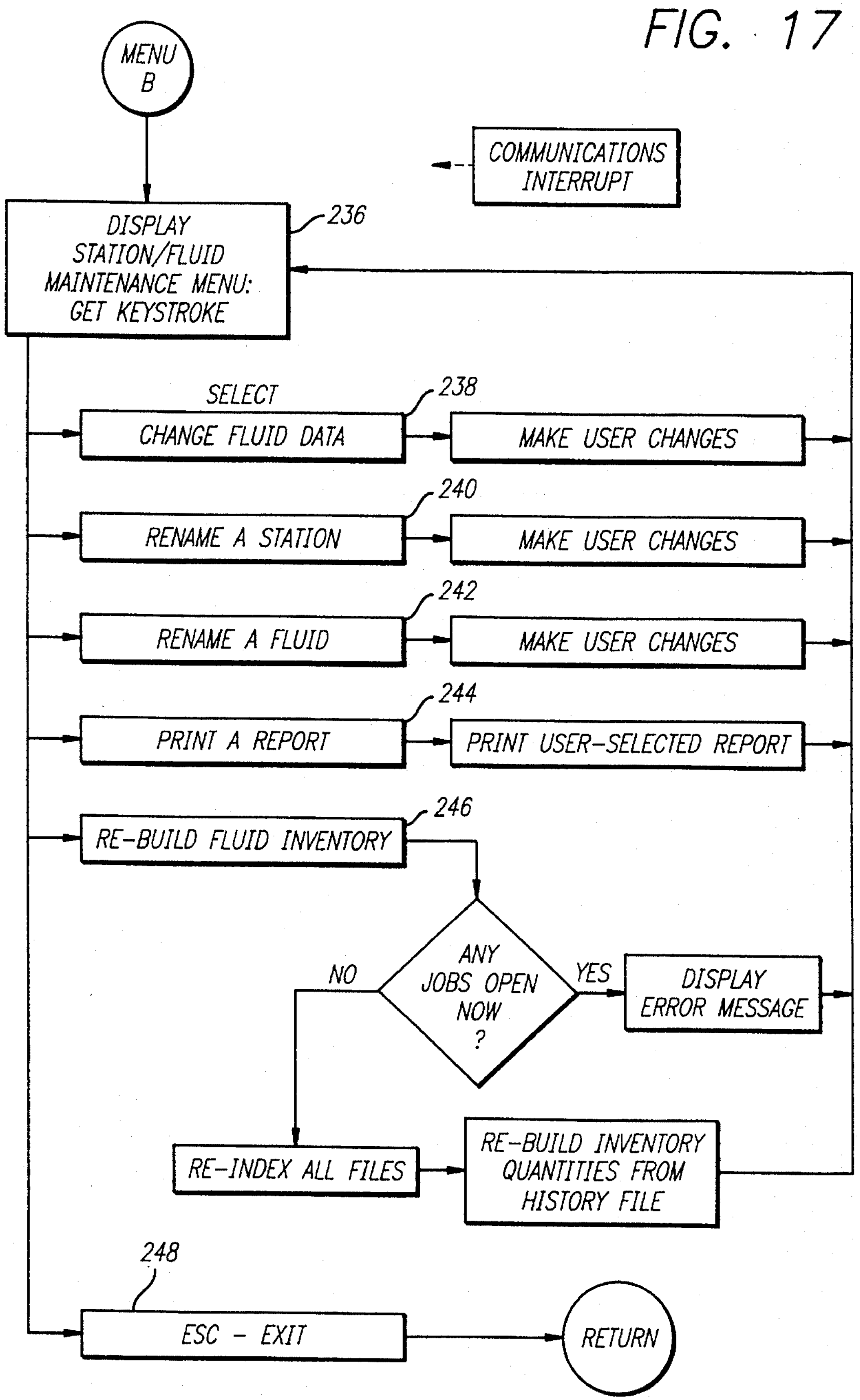
FIG. 17 is a detailed block diagram of the PC control program menu B subroutine.

FIG. 17 is a detailed block diagram of the PC control program menu B subroutine. Upon execution of the fluid/station functions block 206 from the "menus" display, a display station/fluid maintenance menu block 236 is activated. The menu B subroutine provides the PC operator with a user interface through which bulk fluid information may be accessed and modified as desired. By selecting an appropriately dedicated key, the operator initiates execution of a change fluid data block 238 where, for example, a displayed quantity of fluid in a bulk fluid reservoir may be modified. Execution of a rename station block 240 enables the operator to change the name of a station as it is recognized by the PCs 52. A rename fluid block 242 similarly allows the PC operator to re-enter information stored in the PCs 52 and, more particularly, to rename a fluid associated with a particular bulk fluid reservoir 72. Such a software feature is desirable when a different type or grade of motor oil or when a different type of automotive fluid is to be dispensed from the bulk fluid reservoir 72. When the PC operator needs a hard copy of a report pertaining to a particular fluid, the appropriate key is selected to initiate execution of a printer port block 244. Additionally, the PC operator may initiate execution of a rebuild fluid inventory block 246. The PC control program will only rebuild the inventory when no jobs are open by reindexing all files and thereafter rebuilding inventory quantities from appropriately processed history files. The PC operator initiates execution of an escape block 248 to return to the "menus" display.

Figure 18:
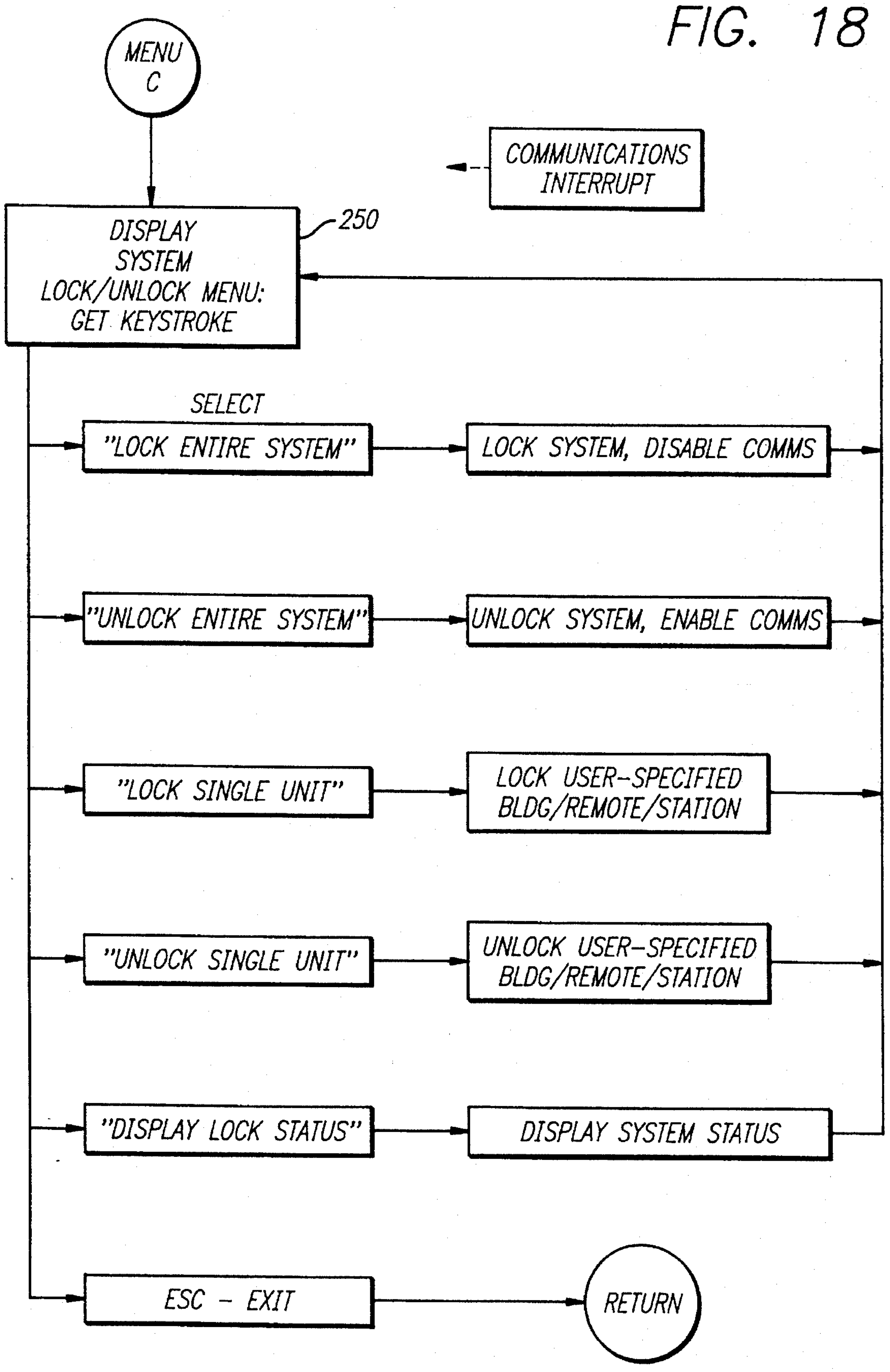
FIG. 18 is a detailed block diagram of the PC control program menu C subroutine.

FIG. 18 is a detailed block diagram of the PC control program menu C subroutine. When the lock buildings/remotes block 208 from the "menus" display is executed, a display system lock/unlock menu block 250 is executed. The menu C subroutine generally provides the PC operator with the ability to selectively lock or unlock single units or the entire system. Additionally, lock statuses may be displayed via the menu C subroutine.

Further, with regard to FIG. 15, the remaining display options of the "menus" display are discussed below. When the PC operator selects the E key, disk backup, restore, and reindex files become accessible and are preferably presented in a user friendly manner to the operator. Important information such as transaction histories and fluid inventories can be archived as often as desired. Additionally, the PC operator may initiate a reindexing of stored filed. As may be readily appreciated, the PC control program may alternatively be implemented to automatically backup transaction records and to reindex information on a desired periodic basis.

A PC operator is presented with yet another menu structure after successfully gaining access to the "menus" display. After initiating execution of the display version numbers block 220, the PC operator is prompted at diamond 252 as to whether or not access to a system menu is desired. As with access to the "menus" display, access to the systems menu may additionally be made contingent upon entry of a valid password by the PC operator.

Figure 19:
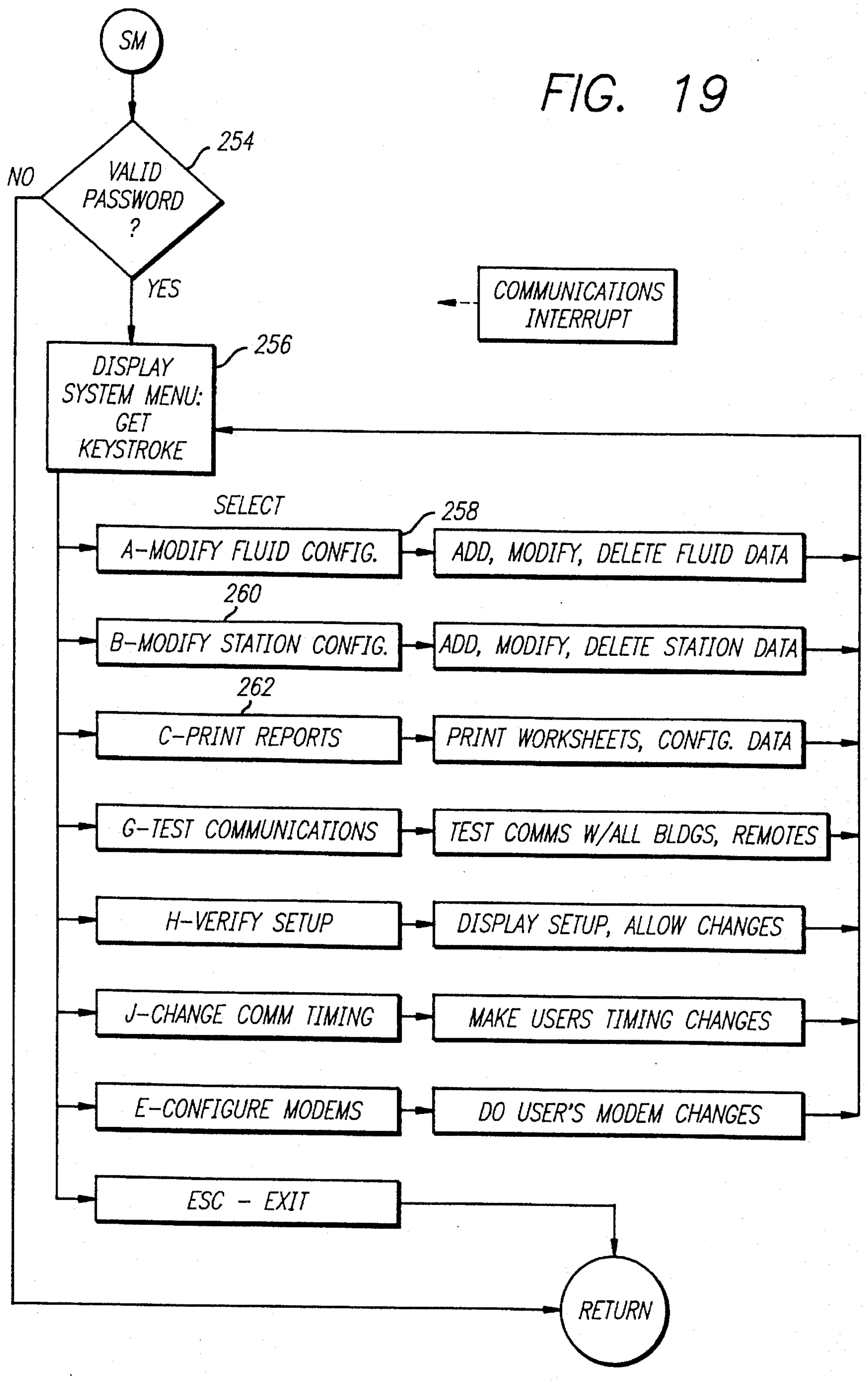
FIG. 19 is a detailed block diagram of the PC control program system menu.

FIG. 19 is a detailed block diagram of the PC control program system menu shown in the bottom half of FIG. 3C. The following description of FIG. 19 also describes the bottom half of FIG. 3C. In the embodiment of the PC control program illustrated in this figure, access to the system menu is determined at valid passwords diamond 254. As the systems menu provides access to and the ability to modify vital information such as fluid inventories modem configurations, etc., an additional level of security is implemented by again asking the operator to provide a password. Preferably, the password provided at diamond 254 is different from the password provided at diamond 200. After a valid password is provided by the operator, a display system menu block 256 is executed. If the A key is selected, a modified fluid configuration block 258 is executed allowing the operator to add, modify or delete fluid data as desired. If the B key is selected, a modify station configuration block 260 is executed allowing the operator to add, modify or delete station data. If the C key is selected, a print reports block 262 is executed providing printouts of work sheets and configuration data. The execution of blocks 258, 260 and 262 may, but do not necessarily, provide access to and the ability to manipulate data beyond that which may be accessed or manipulated with other routines of the PC control program outside of the systems menu structure. Other keyboard activated routines accessible from the system menu principally pertain to testing and verifying communications between the PCs 52 and the remote controllers 56, adjusting communications timing, and establishing modem configurations.

Figure 20:
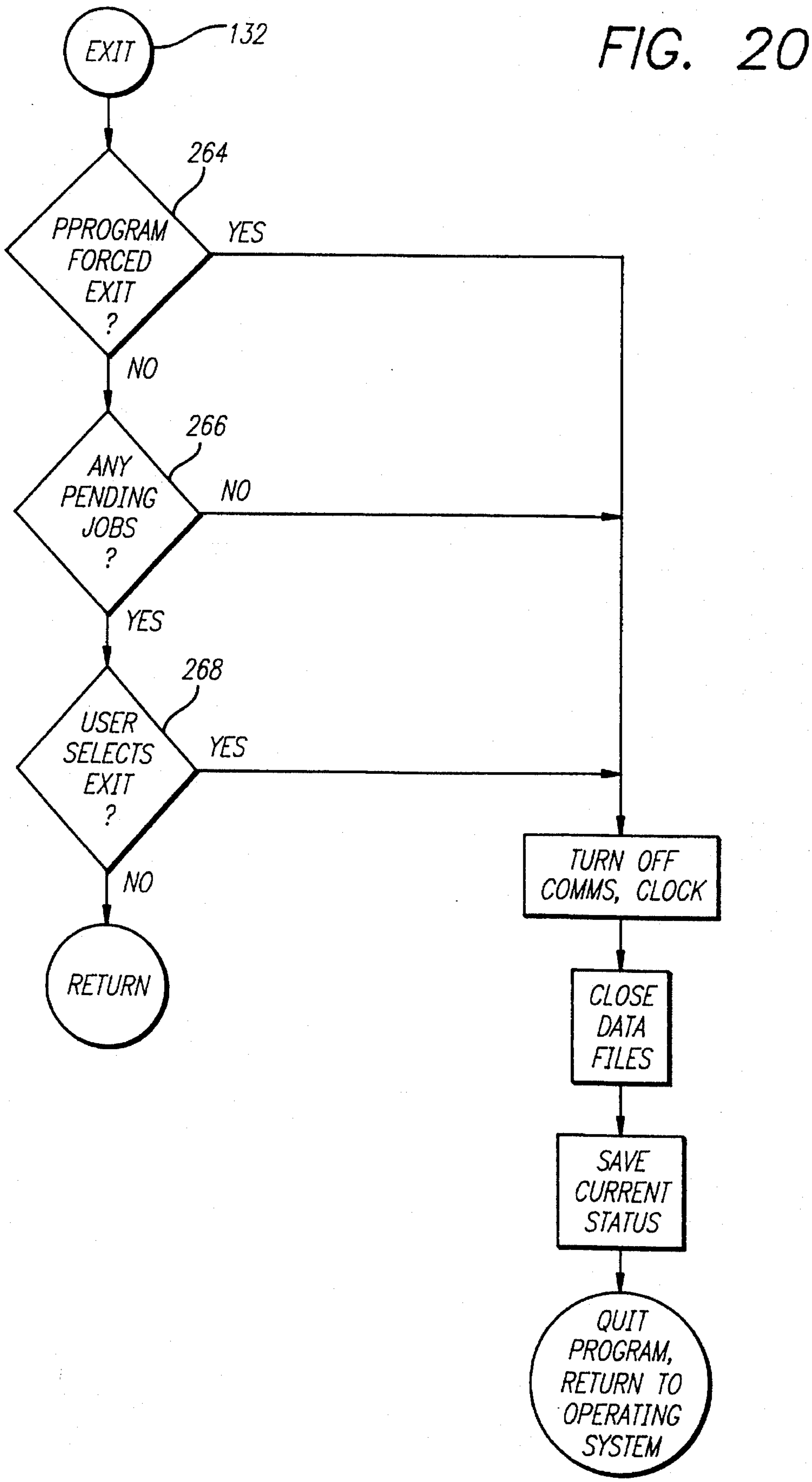
FIG. 20 is a detailed block diagram of the PC control program exit routine.

FIG. 20 is a detailed block diagram of the PC program exit routine which is initiated by selecting the escape key from the main menu. Upon execution, the exit routine determines at diamond 264 whether or not a program forced exit exists. Such conditions include but are not limited to a fire alert condition, a theft alert condition, and a loss of power condition. Mechanisms for detecting these and other conditions and the provision of signals indicative of such conditions to computer interfaces are well known and therefore not illustrated in the figures accompanying this disclosure.

If a program forced exist condition does not exist, the exit routine determines at diamond 266 whether or not any fluid dispensation jobs are still pending. If not, the exit routine turns off communications, clocks, closes data files, saves current statuses and quits the PC control program exiting to the operating system of the PC 52. If jobs are still pending, the operator is given an opportunity at diamond 268 to return to the main menu.

Figure 21:
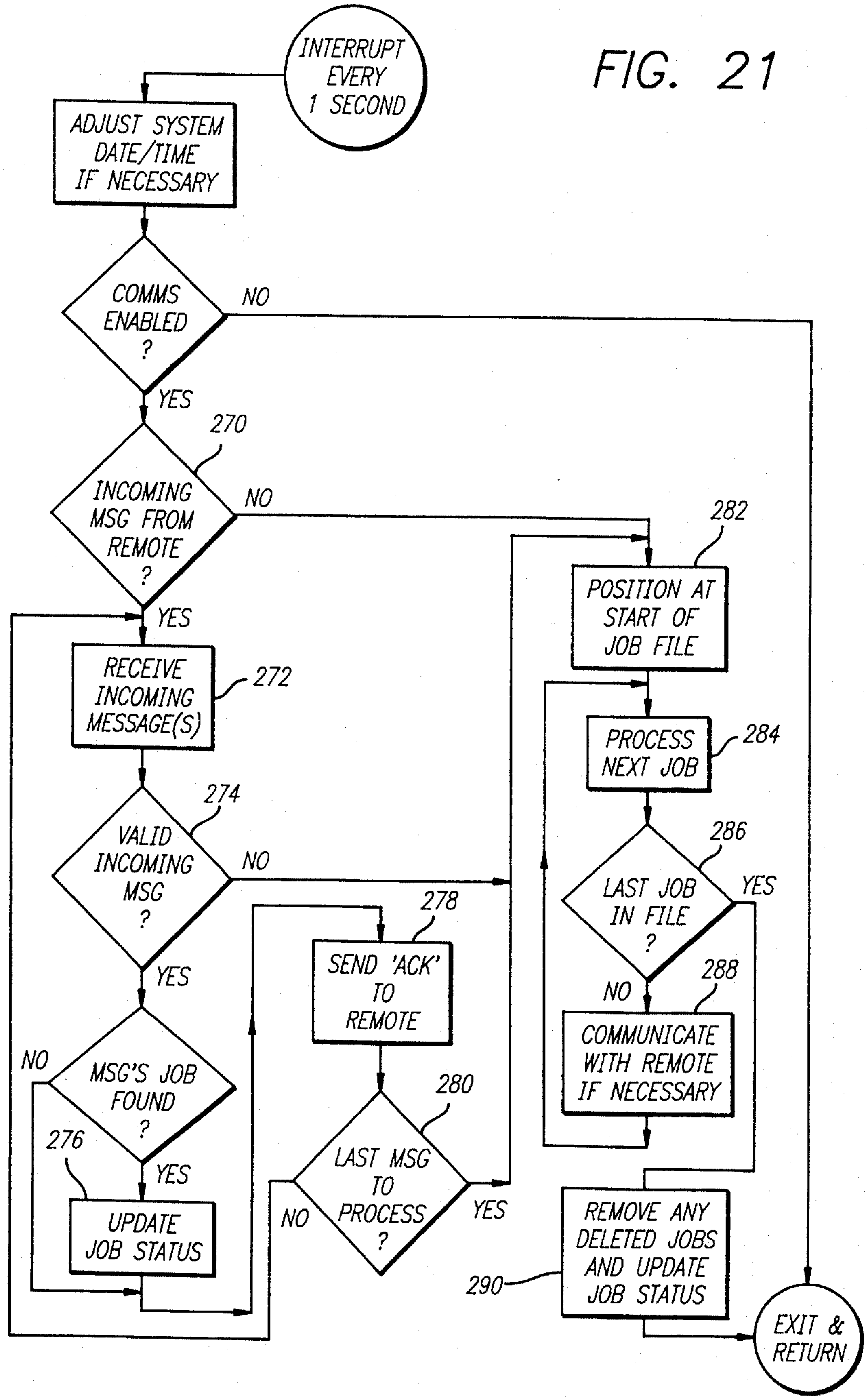
FIG. 21 is a detailed block diagram of the PC control program communications interrupt.

FIG. 21 is a detailed block diagram of the PC control program communications interrupt. At diamond 270 the PC control program determines whether or not an incoming message from the remote controllers is present. After receiving such a message at receiving incoming messages block 272, the communications interrupt routine determines whether or not such messages are valid at diamond 274. If the job corresponding to the incoming message is to be processed, the update job status block 276 is executed. In either case, a send acknowledgement to remote block 278 is executed before the communications interrupt routine checks at diamond 280 to determine whether or not this is the last message to process.

A job processing path of the communications interrupt routine is executed when there are no more valid incoming messages to be processed. First, a position at start of job file block 282 is executed. A process next job block 284, a last job in file diamond 286 and a communicate with remote if necessary block 288 are then sequentially executed until there are no more jobs in the file to be processed. At this point, a remove any deleted jobs and update job status block 290 is executed before the communications interrupt routine is exited.

The remote controllers 56 remotely communicate with the PCs 52 and are characterized by processing capability realized in software executed from the processors 60. Generally, PC serial ports provide a remote communication link between the personal computers 52 and the remote controllers 56 and chain serial ports provide a communications interface, whether remote or otherwise, between different remote controllers 56.

FIG. 22 is a detailed block diagram of the remote controller start up procedure. The processor 60 is set up at CPU set up block 292 and the building or site addresses are read at block 294. A system initialization block 296, an interrupt initialization block 298 and a serial port initialization block 300 are then executed during the start up routine.

FIG. 23 is a block diagram of the remote controller scheduler. After initialization, the remote controllers 56 execute a poll subroutine 302 and a tasks subroutine 304 as shown in FIG. 23. The remote controller software is additionally programmed to respond to a PC port interrupt 306, a chain port interrupt 308 and a one second time tick 310.

Figure 24:
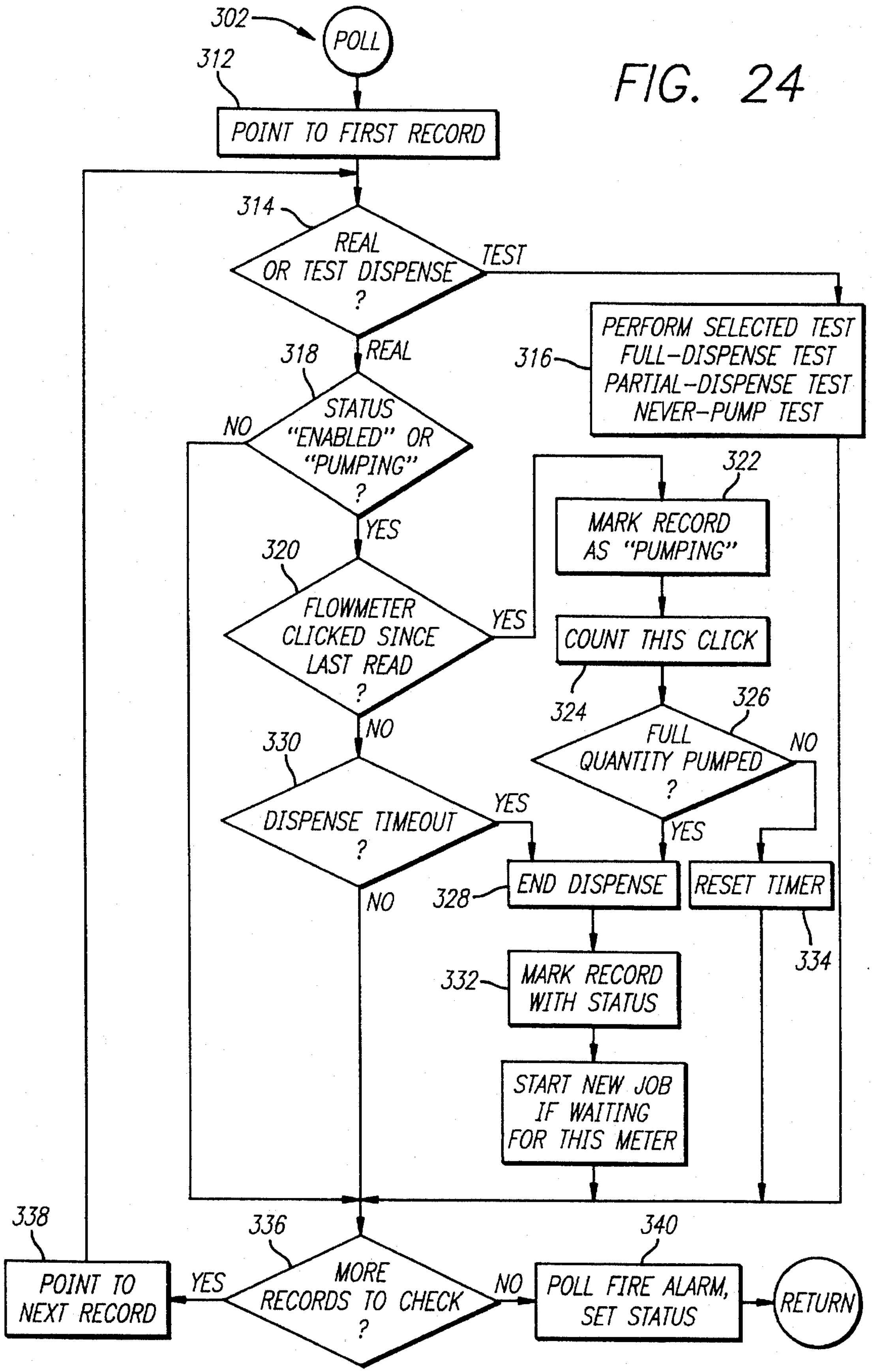
FIG. 24 is a detailed block diagram of the remote controller meter polling subroutine.

FIG. 24 is a detailed block diagram of the remote controller meter polling subroutine. At a point to first record block 312, the meter polling subroutine checks all records which were addressed to and are now stored in memory of the remote controller 56. Further processing of queued jobs next proceeds to diamond 314 where the remote controller meter polling subroutine determines whether or not the first record calls for a real or test dispense. A perform selected test block 316 executes diagnostic tests verifying the functionality of communications with the fluid flow meters 62 and the electric valves 64 and operation of the software controlled switching without actually pumping fluids. Preferably, preprogrammed diagnostics include a full dispense test, a partial dispense test and a never pump test.

If an accessed record indicates that a real fluid dispensation is to be responded to, the meter polling subroutine then checks at diamond 318 to determine whether or not the status of the record is enabled. If yes, the meter polling subroutine then determines at diamond 320 whether or not a fluid dispensation is still in progress. The foregoing determination is made by checking to see whether a flow meter has clicked since it was last read. If yes, a mark record as pumping block 322 is executed. A flow meter click count is then incremented at block 324 before the meter polling subroutine checks at diamond 326 to determine whether or not the full authorized quantity has been pumped. If the entire authorized quantity has been dispensed, an end dispense block 328 is executed.

Further with reference to the flow meter clicked since last read diamond 320, a negative response to this inquiry indicates that either the full quantity has already been dispensed, the fluid dispensation was terminated prior to completion, or that a fluid dispensation was authorized but never started during the authorized period (aka "no start"). A dispense time out diamond 330 directs subsequent execution of the meter polling subroutine to the end dispense block 328 if the technician failed to dispense any of the bulk fluid for the duration of a predetermined dispense time out. After a fluid dispensation is terminated, the status of the record is appropriately marked at block 332 depending upon whether or not the full authorized quantity was dispensed, a partial quantity was dispensed, or a no start condition occurred. A reset timer block 334 resets the dispensed time out timer while fluids are actually being pumped thereby preventing a time out condition from occurring while a large volume of fluids is being dispensed. The meter polling subroutine then determines at diamond 336 whether or not there are more records to check. If yes, then an appropriate pointer in the remote controller is directed toward the next record at block 338. If all queued records have been checked, the meter polling subroutine executes a poll fire alarm, set status block 340 and then returns to the scheduler routine.

Figure 25:
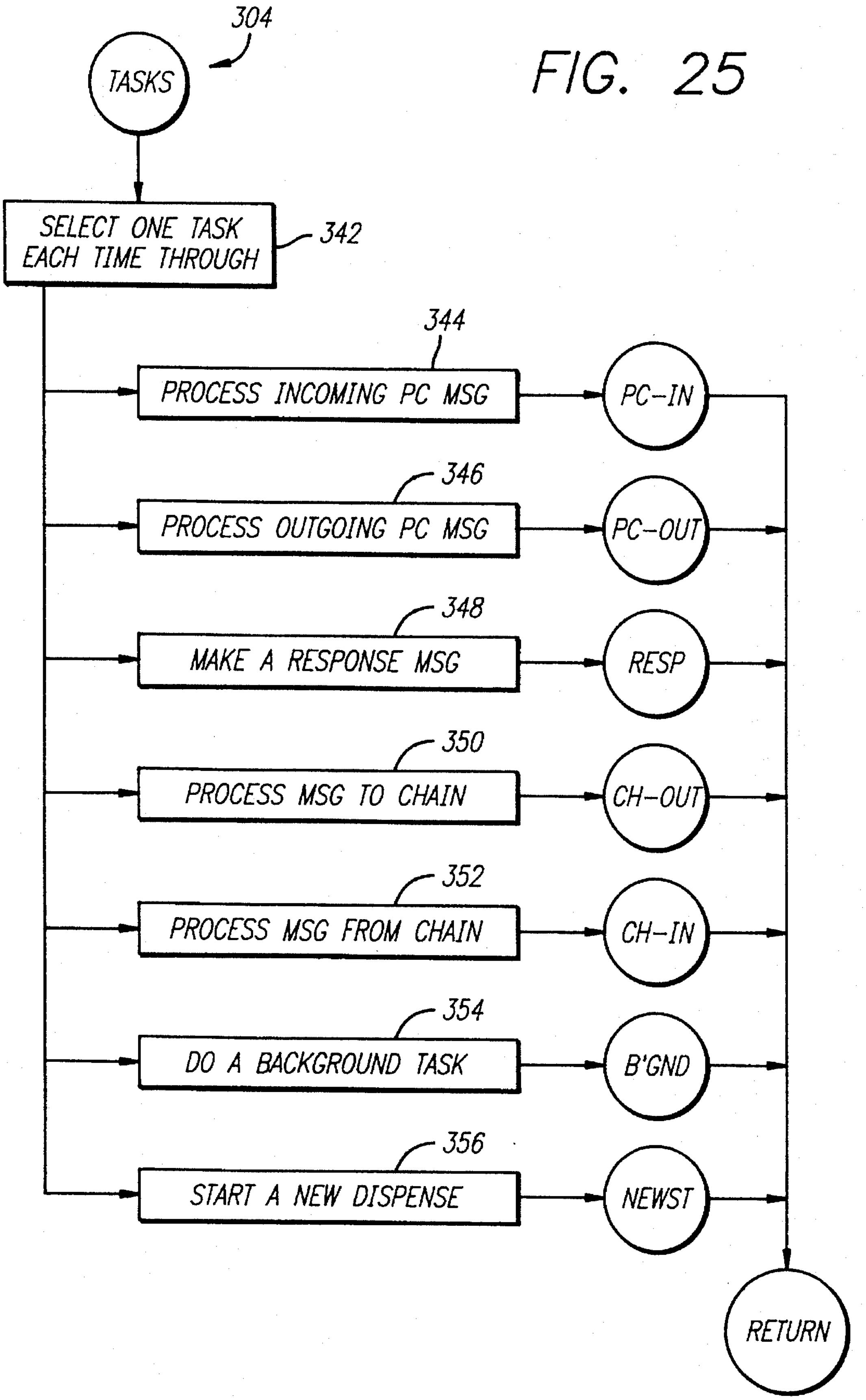
FIG. 25 is a detailed block diagram of the remote controller subtask scheduler subroutine.

FIG. 25 is a detailed block diagram of the remote controller subtask scheduler subroutine. Generally, the remote controller software "multiplexes" between the meter polling subroutine of FIG. 24 and a number of other subtasks as shown in FIG. 25. At a select one task each time through block 342, the subtask scheduler processes one of the following subroutines: process incoming PC messages; process outgoing PC messages; make a response message; process message to chain; process message from chain; do a background task; and start a new dispense. These subroutines may be executed sequentially in the order listed in the preceding sentence. Alternatively, other sequences may be provided depending upon the relative importance of the various subroutines with some of the subroutines being selected more frequently than others. FIG. 25 shows that the subtask scheduler includes a process incoming PC message block 344, a process outgoing PC message block 346, a make a response message block 348, a process message to chain block 350, a process message from chain block 352, a do a background task block 354 and a start a new dispense block 356. After execution of the selected subroutine is completed, the remote controller software exits from the subtask scheduler subroutine and returns to the meter polling subroutine.

Figure 26:
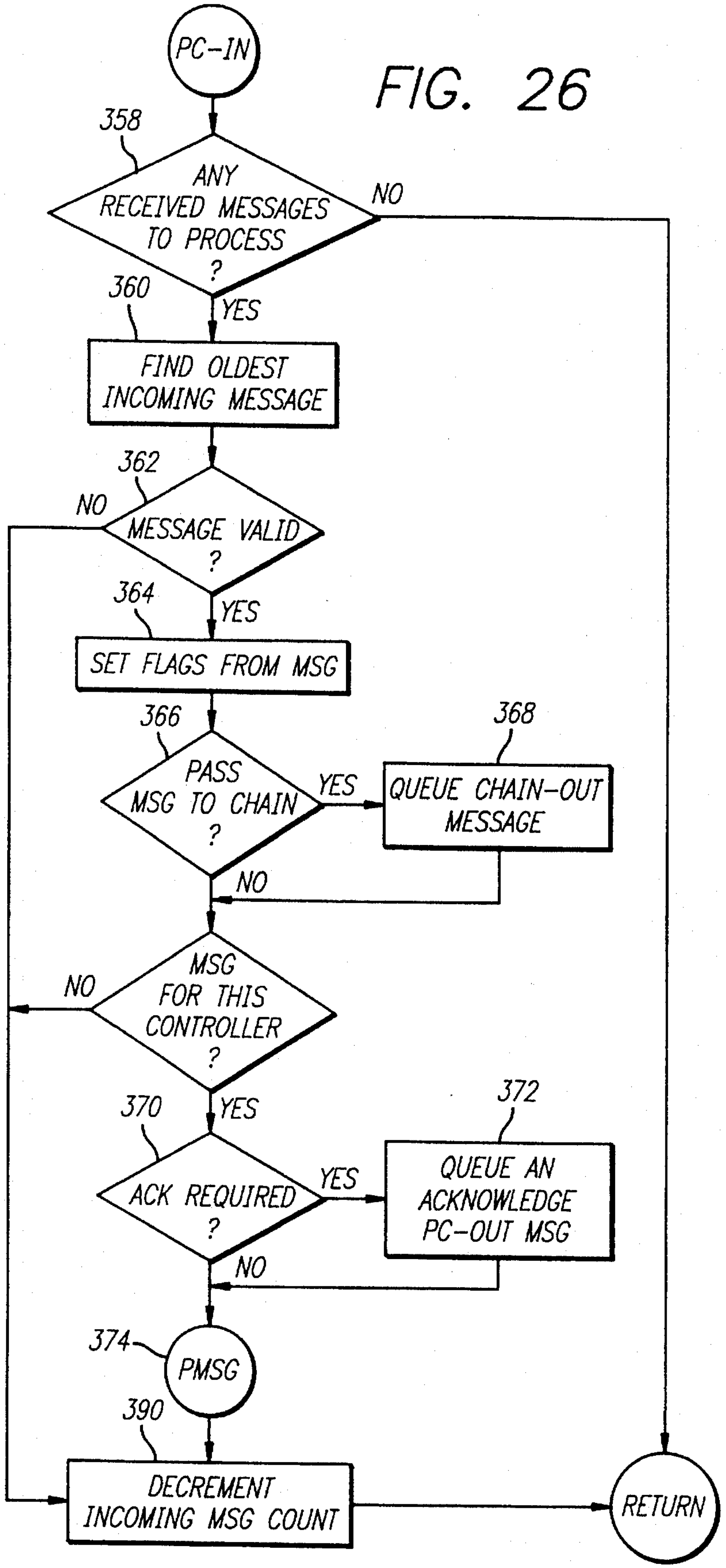
FIG. 26 is a detailed block diagram of the remote controller PC-incoming message processing subroutine.

FIG. 26 is a detailed block diagram of the remote controller PC-incoming message processing subroutine. If any message is received via the PC serial port needs to be processed, a decision diamond 358 directs the algorithm to a find oldest incoming message block 360. The "oldest incoming message" is the unprocessed message received earliest in time or a message which has been given priority to appear to be the oldest message. A message valid diamond 362 passes valid messages to a set flags from message block 364 where the remote controller software sets various software flags corresponding to particular bits of the processed message. Such flags indicate whether or not the message is to be passed at diamond 366 to another remote controller 56 further down the chain. If the message is addressed to a different remote controller 56, a queue chain out message block 368 is executed. If the message is for the receiving remote controller 56, a diamond 370 directs the PC-incoming message processing subroutine to a queue and acknowledgement PC-out message block 372. Independent of whether or not the remote controller 56 needs to acknowledge the PC message, the PC-incoming message processing subroutine next executes a PC-command processing subroutine 374.

Figure 27:
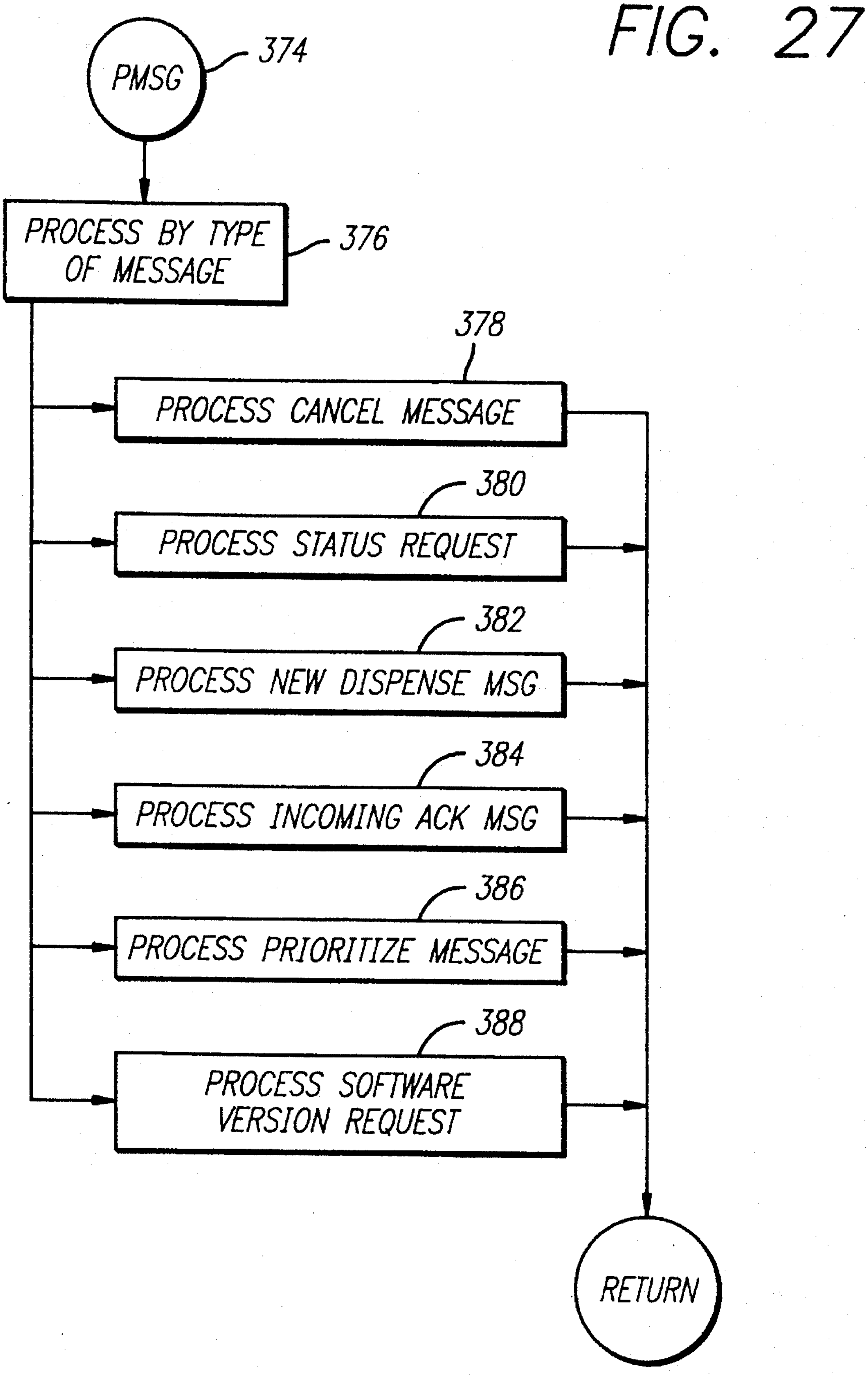
FIG. 27 is a detailed block diagram of the remote controller PC-command processing subroutine.

FIG. 27 is a detailed block diagram of the remote controller PC-command processing subroutine. A process by type of message block 376 differentiates received messages by reading predesignated bit header information or the like. Generally, the remote controller 56 responds to PC commands by modifying parameters stored within a memory device of the remote controller 56 or by transmitting information via the port to the PC 52. Depending upon message type, the PC-command processing subroutine executes a process cancel message block 378, a process status request block 380, a process new dispense message block 382, a process incoming acknowledgement message block 384, a process prioritize message block 386 or a process software version request block 388. After one of the foregoing blocks is executed, the remote controller software returns to the PC-incoming message processing subroutine.

Further with regard to FIG. 26, the PC-incoming message processing subroutine includes a decrement incoming message count block 390 which is executed after a PC incoming message is processed and when the incoming message is for a different remote controller 56. After the incoming message count is decremented, the remote controller software returns to the meter polling subroutine.

Figure 28:
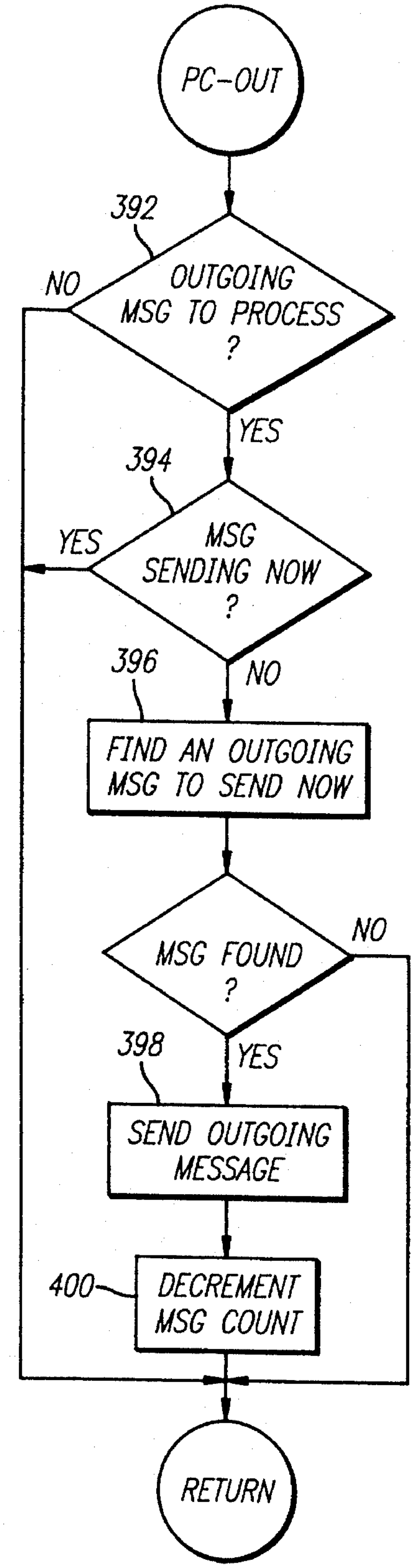
FIG. 28 is a detailed block diagram of the remote controller PC-outgoing message processing subroutine.

FIG. 28 is a detailed block diagram of the remote controller PC-outgoing message processing subroutine. Messages are transmitted from ports to the PCs 52 when an affirmative determination is made at an outgoing message to process diamond 392. Another decisional diamond 394 returns the remote controller software to the meter polling subroutine if a message is presently being transmitted to the PCs 52. If no such transmission is occurring, a find an outgoing message to send now block 396 is executed. If a message is found, a send outgoing message block 398 and then a decrement message count block 400 are executed.

Figure 29:
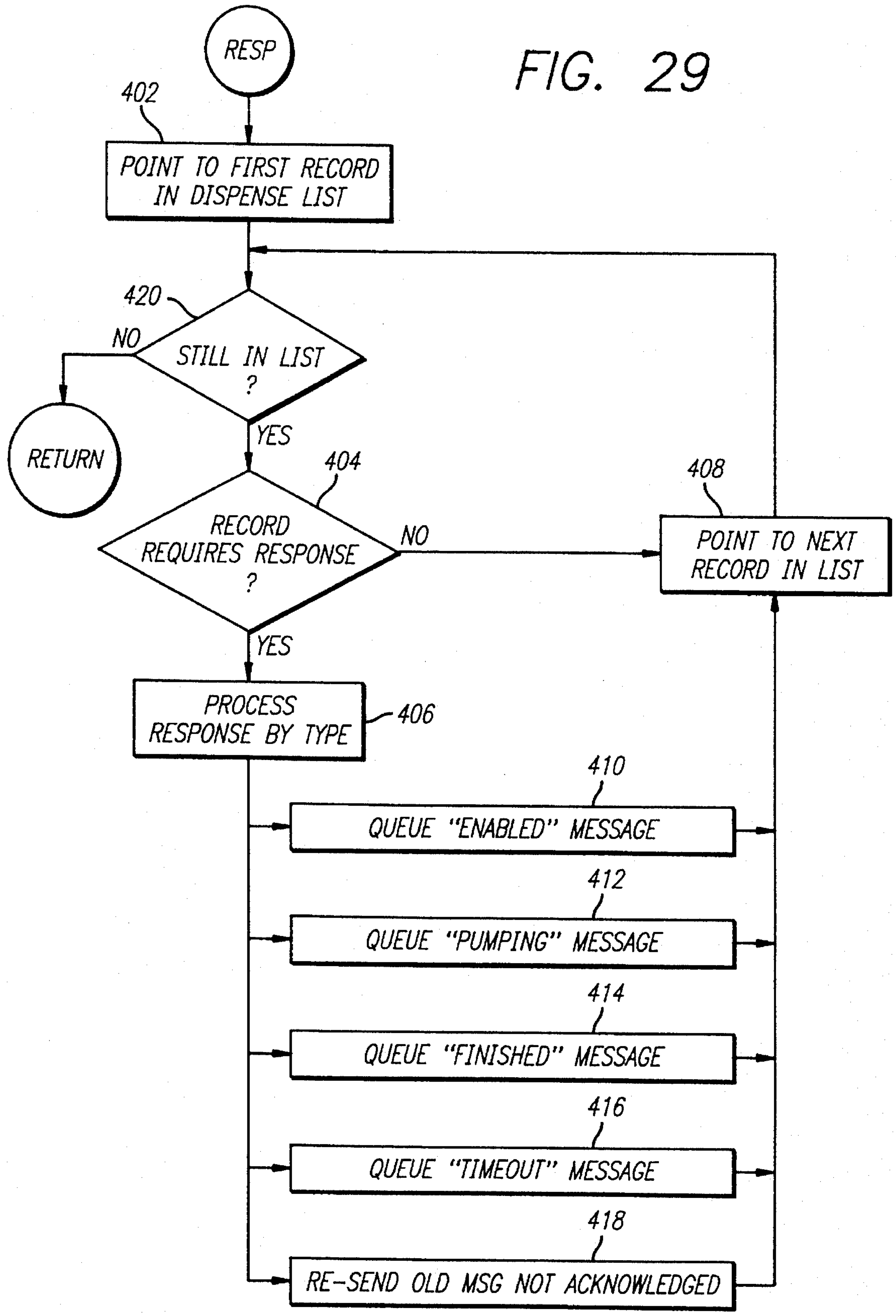
FIG. 29 is a detailed block diagram of the remote controller response message processing subroutine.

As mentioned earlier, the remote controllers 56 process response messages for transmission to the PCs 52. FIG. 29 is a detailed block diagram of the remote controller response message processing subroutine. A processor pointer is initially directed toward the memory location of a first record in a dispense list pursuant to execution block 402. As not all records require a response from the remote controllers 56, a record requires response diamond 404 directs execution to a process response by type block 406 only when a response is required. If no response is required, a point to next record in list block 408 is executed.

As with the remote controller PC-command processing subroutine, the response message processing subroutine processes the messages by type and then executes a queue enabled message block 410, a queue pumping message block 412, a queue finished message block 414, a queue time out message block 416, or a resend old message not acknowledged block 418. After the response message processing subroutine has analyzed all of the records to determine whether or not responses are required, a decisional diamond 420 directs execution of the remote controller software back to the meter polling subroutine.

Figure 30:
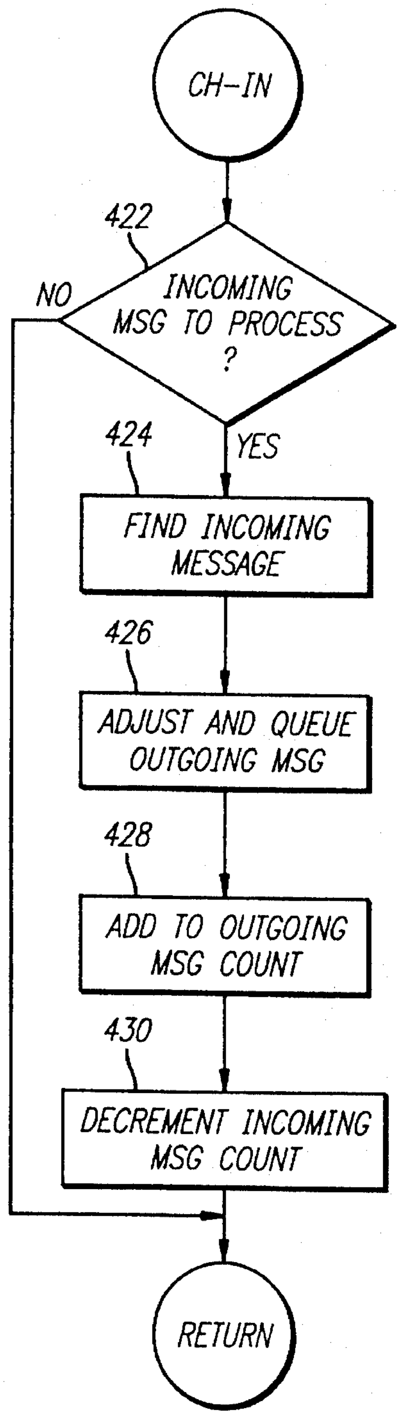
FIG. 30 is a detailed block diagram of the remote controller chain-incoming message processing subroutine.

FIG. 30 is a detailed block diagram of the remote controller chain-incoming message processing subroutine. The remote controller software embodied in each processor 60 facilitates bi-directional communication along a chain of serially or otherwise electronically interconnected remote controllers 56. After an affirmative determination is made at an incoming message to process decision diamond 422, a find incoming message block 424 is executed. Next, an adjust and queue outgoing message block 426 is executed. A storage device within the remote controllers 56 stores queued incoming and outgoing messages from other remote controllers 56 and tracks how many such messages are queued at any given time. Accordingly, the chain-incoming message processing subroutine then executes an add to outgoing message count block 428 and then a decrement incoming message count block 430.

Figure 31:
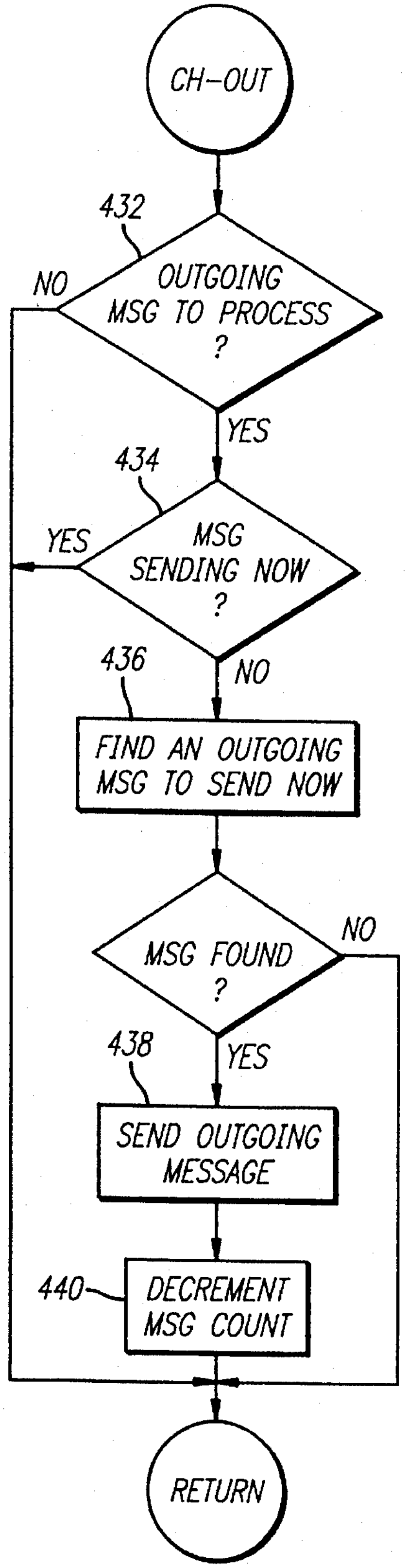
FIG. 31 is a detailed block diagram of the remote controller chain-outgoing message processing subroutine.

FIG. 31 is a detailed block diagram of the remote controller chain-outgoing message processing subroutine. A decisional diamond 432 first determines whether or not an outgoing message to another remote controller 56 needs to be processed. If yes, a message sending now diamond 434 checks to see if a message is presently being transmitted via the PC serial port. If no, a find an outgoing message to send now block 436 is executed. If a message is found, a send an outgoing message block 438 and then a decrement message count block 440 are executed.

Figure 32:
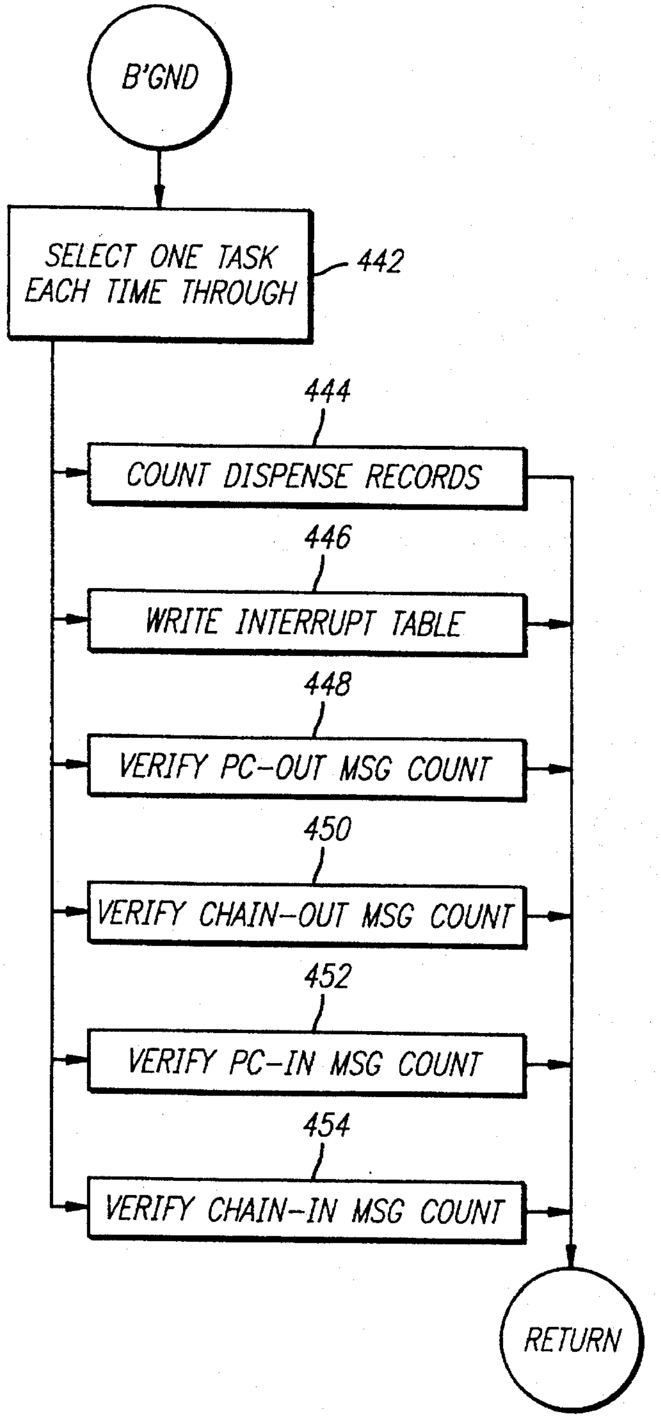
FIG. 32 is a detailed block diagram of the remote controller background tasks subroutine.

FIG. 32 is a detailed block diagram of the remote controller background tasks subroutine. After execution of a select one task each time through block 442, the background tasks subroutine performs at least one task from a group including but not limited to a count dispense records block 444, a write interrupt table block 446, a verified PC out message count block 448, a verified chain-out message count block 450, a verified PC-in message count block 452 and a verified chain-in message count block 454. An ordering of and a determination of how frequently the foregoing tasks will be selected may be adjusted to depend upon the relative importance of each task at any given time during execution of the remote controller software.

Figure 33:
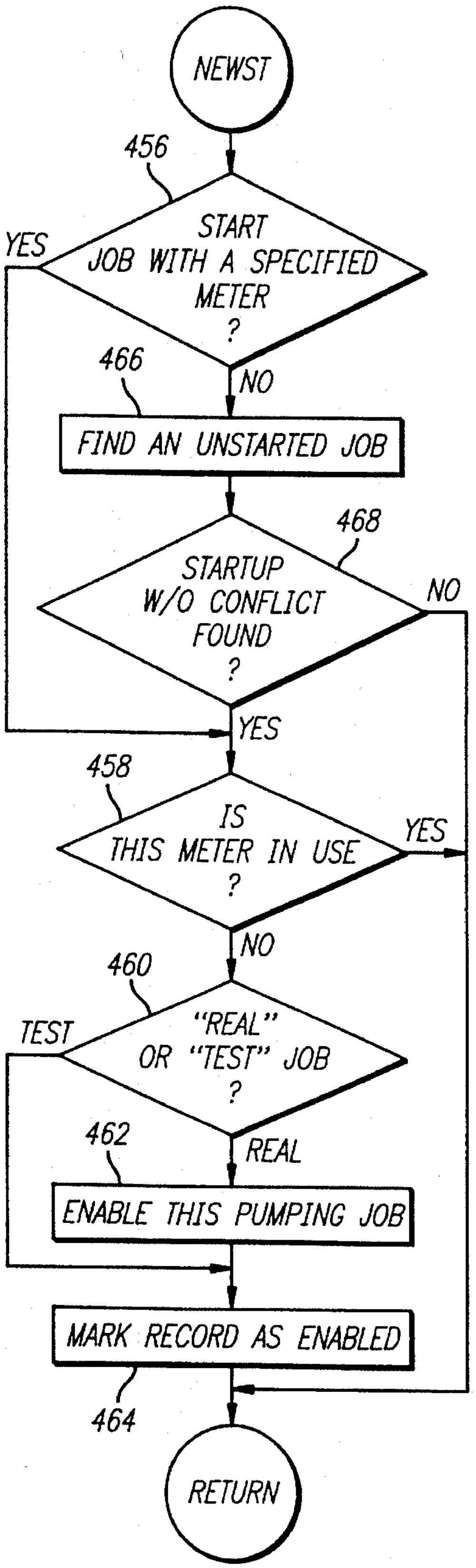
FIG. 33 is a detailed block diagram of the remote controller new job start subroutine.

FIG. 33 is a detailed block diagram of the remote controller new job start subroutine. The remote controller software allows the PC operator to send a job to a specified fluid flow meter 62. An affirmative determination at a start job with a specified meter diamond 456 directs execution of the remote controller software to another diamond 458 where the new job start subroutine determines whether or not the selected meter is available for use. If the meter is not in use, a diamond 460 directs execution of the remote controller software to an enable this pumping job block 462 only if the job is a real job rather than a test job. In either case, a mark record as enabled block 464 is executed thereafter.

The PC operator may alternatively wish to send the job to any available fluid station which is dispensing the desired bulk fluid from one of its meters 62. In such a case, diamond 456 directs execution of the remote controller software to a find an unstarted job block 466. The new job start subroutine then checks at diamond 468 whether or not any request conflicts exist. If no conflict is present, the remote controller software advances to the diamond 458 and continues execution as discussed above. If a start up cannot be initiated without a conflict, the remote controller software returns to the meter polling subroutine.

Figure 34:
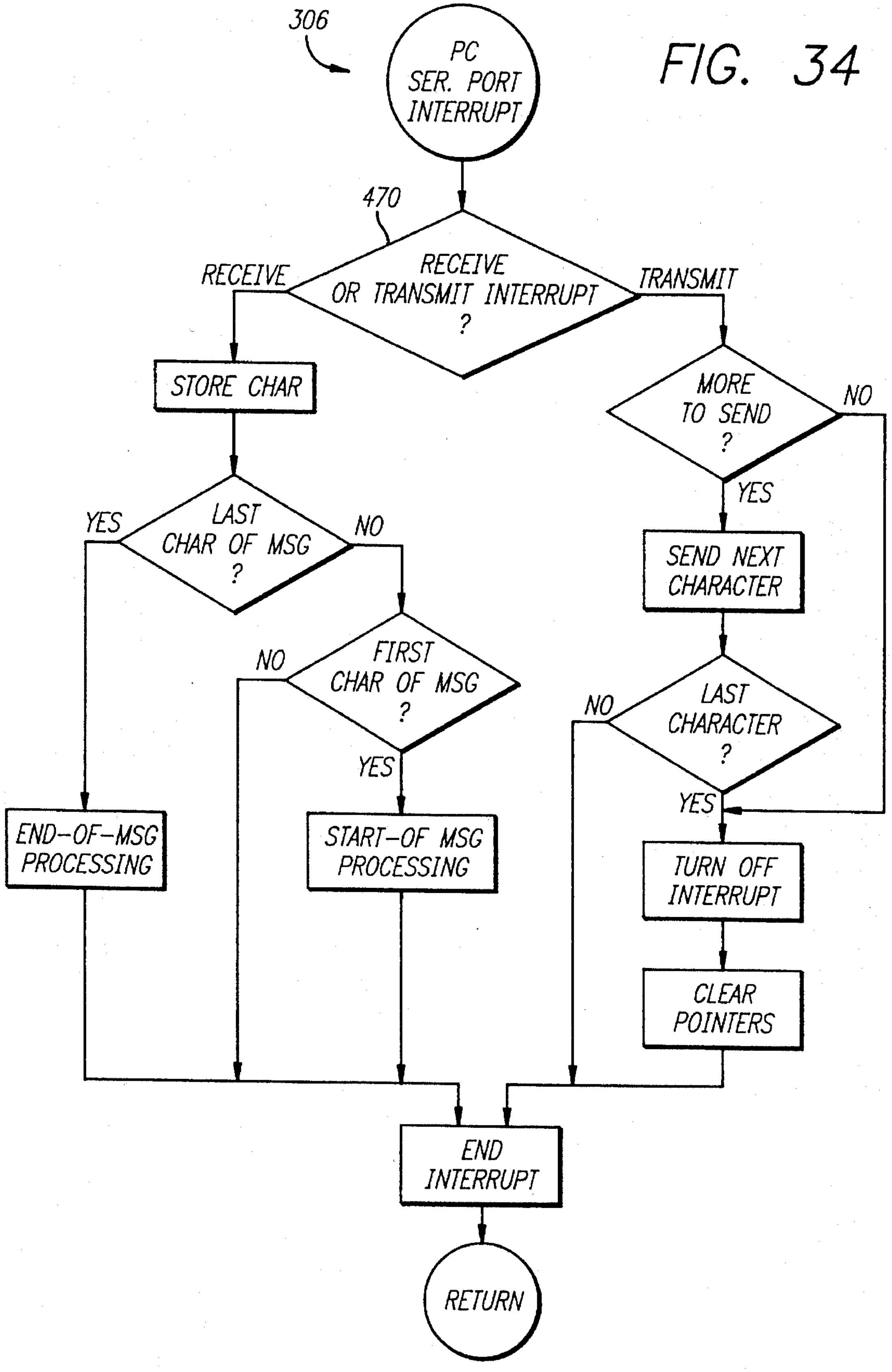
FIG. 34 is a detailed block diagram of the remote controller serial interrupt from PC port.

FIG. 34 is a detailed block diagram of the remote controller serial interrupt from PC port. At decisional diamond 470, the serial interrupt from PC port routine determines whether or not a message is to be received or transmitted during interrupt processing. The respective processing paths of the receive and transmit interrupts are carried out as shown in FIG. 34 and are self explanatory.

Figure 35:
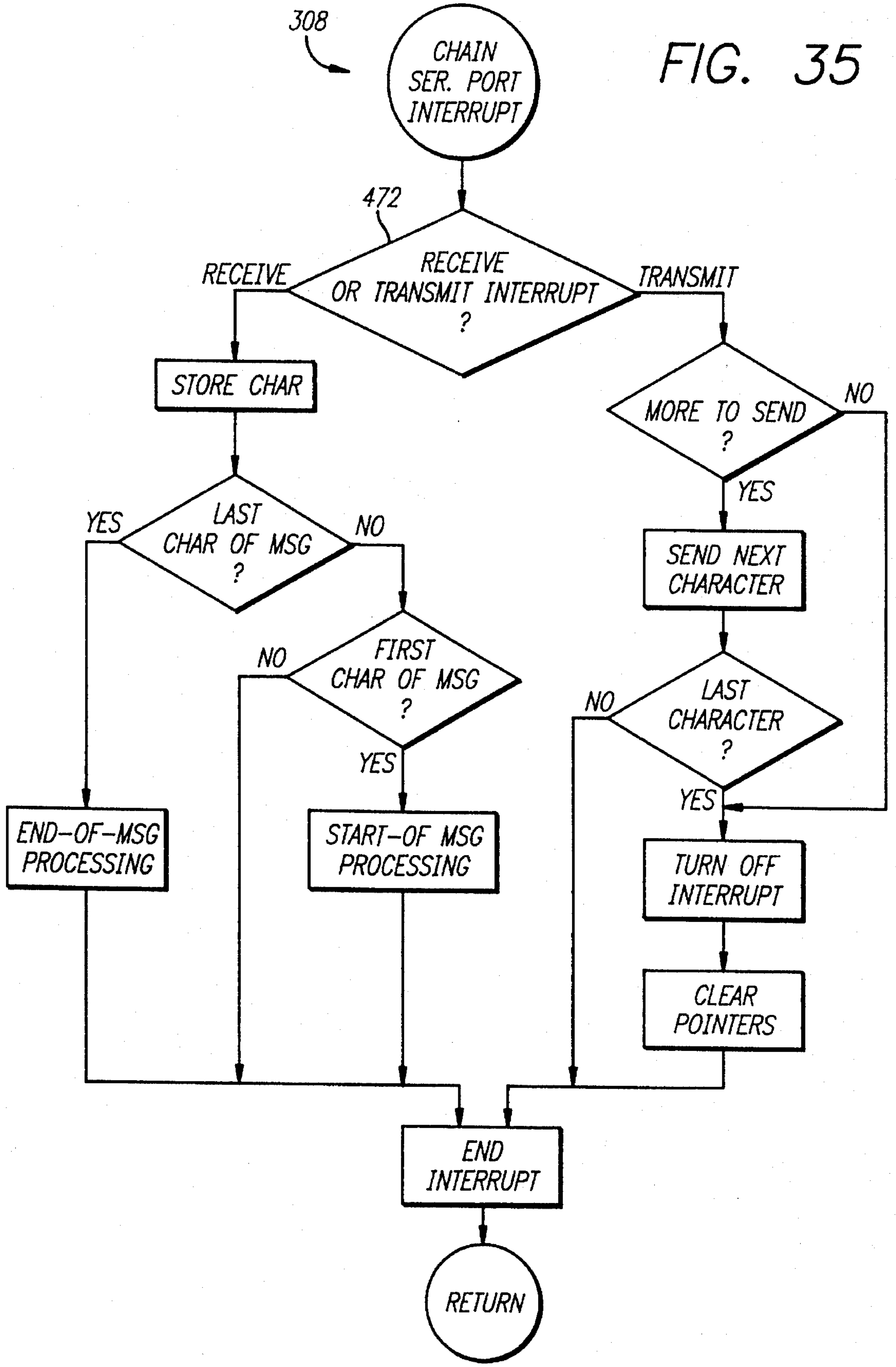
FIG. 35 is a detailed block diagram of the remote controller serial interrupt from chain port.

FIG. 35 is a detailed block diagram of the remote controller serial interrupt from chain port. A decisional diamond 472 determines whether or not the chain serial port interrupt requires processing for a receive or transmit signal.

Figure 36:
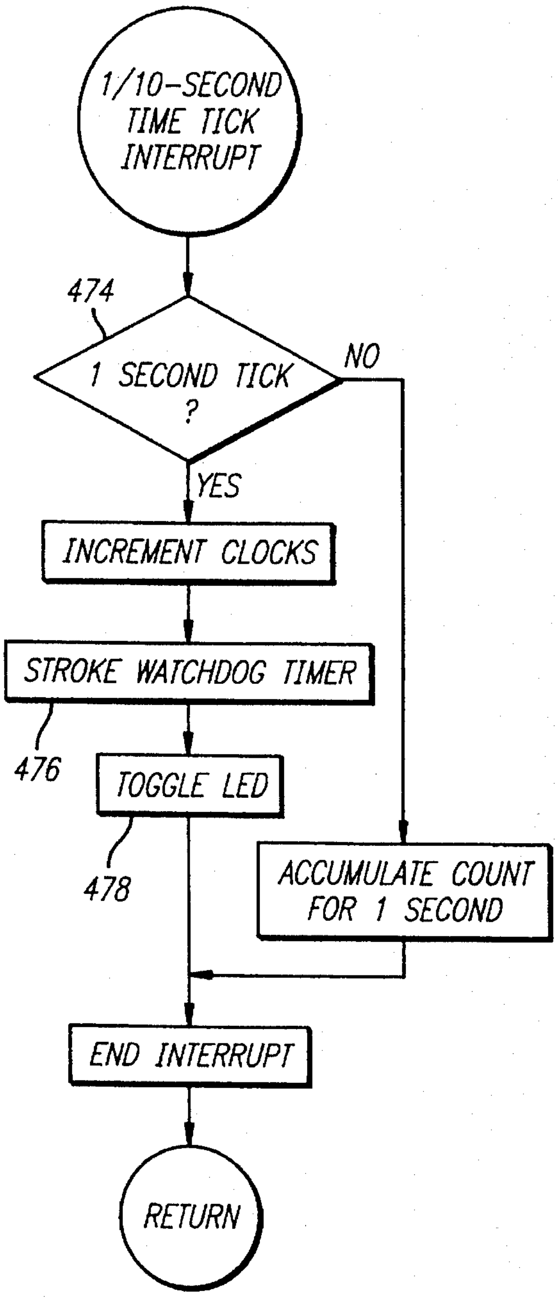
FIG. 36 is a detailed block diagram of the remote controller one second time tick interrupt.

FIG. 36 is a detailed block diagram of the remote controller one second time tick interrupt. At a predetermined time interval such as one second, a decisional diamond 474 provides an input to a watch dog timer block 476 which in turn initiates the toggling of a light emitting diode or similar device at block 478.

In conclusion, it is to be understood that the foregoing detailed description and the accompanying drawings illustrate the principles of the invention. However, various changes and modifications may be employed without departing from the spirit and scope of the invention. Thus, by way of example and not of limitation, the remote controllers 56 may additionally include a user interface enabling the technicians to request authorization for a fluid dispensation. Additionally, the PCs 52 may be programmed to automatically update inventories and other stored information. Communication links between the PCs 52 and the remote controllers 56 are not necessarily limited to those including serial port interfaces as other more advanced transmission techniques are contemplated as being within the scope of the present invention. In addition, instead of a full keyboard, monitor and computer as shown at the upper left in FIG. 1, simplified input and display units could be used, such as a specific auto-related custom fluid order keyboard and a line type display, for specific examples. It is also noted that the system of the present invention may store and dispense petroleum based or other fuels, including gasoline and diesel fuel, for specific examples. Accordingly, the present invention is not limited to the specific form shown in the drawings and described in detail hereinabove.

What is claimed is:

1. A system for the controlled and metered dispensing of fluids comprising:

a central controller including a computer, a display and a manual input;

at least one remote control center, including a microprocessor;

said microprocessor at said remote control center and said controller being coupled together for two-way signal transmission; and said remote control center including:

(a) at least one bulk fluid stored in a bulk container;

(b) a plurality of individual work stations with manual valves at said work stations for dispensing said fluids;

(c) fluid flow lines coupling said containers to said manual valves at said work stations;

(d) a flow meter in each fluid flow line providing electrical signals to said microprocessor representative of fluid flow; and (e) electrically controlled valves in series with said manual valves, said electrically controlled valves being operatively coupled to said microprocessor for permitting dispensing of amounts of fluids in accordance with signals from said central controller and said signals from said flow meter.

2. The system of claim 1 further comprising a printer coupled to said computer for printing out customer and associated fluid dispensing information.

3. The system of claim 1 including visual and audio means for alerting persons at said work station that one of said electrically controlled valves at said work station has been opened.

4. The system of claim 1 wherein each said electrically controlled valve is opened for only a limited period of time.

5. The system of claim 1 wherein said computer shuts down operation of said system during predetermined time periods.

6. The system of claim 1 including a plurality of remote control centers.

7. The system of claim 1 wherein automobile motor oil and automobile transmission fluid are stored in two of said containers, and wherein fluid flow lines extend from each of said containers to each of a plurality of said work stations.

8. The system of claim 1 wherein said central controller and said satellite centers are coupled together by a radio frequency link.

9. The system of claim 1 wherein said central controller and said satellite centers are coupled together by modems and telephone lines.

10. The system of claim 1 wherein a flow meter is associated with said fluid flow lines at each work station.

11. The system of claim 1 wherein a single flow meter is included in the fluid flow line serving a plurality of work stations from one of said containers.

12. A system as defined in claim 1 wherein fuels are stored in bulk containers, and wherein fluid flow lines extend from each of said containers to each of a plurality of said work stations.

13. A system as defined in claim 1 wherein said central controller and said control center are coupled together by direct wire connection.

14. A system for controlling the dispensing of materials comprising:

at least one metered quantity control apparatus controlling a movement of materials from at least one bulk material supply in response to an authorization signal;

a central controller for establishing an electronic interconnection map corresponding to interconnections between said at least one bulk material supply and said at least one metered quantity control apparatus, said central processor employing said electronic interconnection map to generate said authorization signal; and a remote communication link for providing said authorization signal from said central processor to said at least one metered quantity control apparatus.

15. The system of claim 14 wherein:

said at least one metered quantity control apparatus comprises at least one metered valve apparatus;

said at least one bulk material supply comprises at least one bulk fluid reservoir; and said movement of materials comprises a movement of fluid.

16. The system of claim 15 wherein:

said at least one metered valve apparatus generates fluid dispensing signals in response to said fluid movement; and said central controller further employs said fluid dispensing signals to generate said authorization signal.

17. The system of claim 15 wherein said central controller includes a storage device for storing system configuration information and transaction records including said electronic interconnection map.

18. The system of claim 17 further comprising:

an operator interface to said central controller for initiating a configuration change to said system configuration information.

19. The system of claim 17 further comprising:

an operator interface to said central controller for providing a visual indication of said system configuration information and said transaction records.

20. A method for controlling a dispensation of a fluid comprising the steps of:

providing a central controller;

providing at least one remote fluid dispensing station, each said station including at least one fluid dispensing conduit, at least one metered valve apparatus for regulating movement of fluids through said at least one fluid dispensing conduit and a processor for controlling said at least one metered valve apparatus, each said processor being electrically connected to said central controller via a communication link;

establishing, at said central controller, system configuration information and transaction records including an electronic fluid-station interconnection map corresponding to fluid-station plumbing interconnections between said at least one fluid and said at least one dispensing station; and employing said electronic fluid-station interconnection map to provide from said central controller, via said communication link, an authorization to dispense a predetermined quantity of a selected fluid of said at least one fluid through a selected conduit of said at least one fluid conduit to said processor controlling said metered valve apparatus of said selected conduit.

21. The method of claim 20 further comprising the steps of:

modifying said system configuration information in response to a configuration change;

providing fluid dispensing signals from said at least one metered valve apparatus to said central controller via said communication link;

modifying said transaction records in response to said fluid dispensing signals; and providing a user interface to said central controller for initiating said configuration change and for providing a visual indication of said configuration information and said transaction records.

22. A method for controlling a dispensation of a fluid comprising the steps of:

providing an authorization signal to at least one metered valve apparatus for controlling a movement of fluid from at least one bulk fluid reservoir through at least one bulk fluid conduit;

providing a remote communication link between said at least one metered valve apparatus and a central controller;

configuring, at said central controller, an electronic reservoir-conduit interconnection map corresponding to reservoir-conduit plumbing interconnections between said at least one bulk fluid reservoir and said at least one fluid conduit;

employing said electronic reservoir-conduit interconnection map to generate said authorization signal; and employing said remote communication link to transmit said authorization signal from said central controller to said at least one metered valve apparatus.

23. A method for controlling a dispensation of a fluid comprising the steps of:

providing at least one metered valve apparatus, each said apparatus being operationally coupled to a fluid dispensing conduit and regulating a movement of fluid therethrough in response to an authorization signal, each said apparatus generating fluid dispensing signals in response to said fluid movement;

providing a central controller for generating said authorization signal in response to said fluid dispensing signals; and establishing a remote communication link between said central controller and said at least one metered valve apparatus facilitating transmissions of said authorization signal and said fluid dispensing signals.

* * * * *